United States Patent
Akazawa et al.

(10) Patent No.: US 9,706,459 B2
(45) Date of Patent: Jul. 11, 2017

(54) WIRELESS COMMUNICATION APPARATUS AND WIRELESS COMMUNICATION METHOD

(71) Applicant: FUJITSU LIMITED, Kawasaki-shi, Kanagawa (JP)

(72) Inventors: Kimihisa Akazawa, Fukuoka (JP); Eiji Matsumoto, Fukuoka (JP); Shinya Tokuyasu, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/547,213

(22) Filed: Nov. 19, 2014

(65) Prior Publication Data
US 2015/0172978 A1   Jun. 18, 2015

(30) Foreign Application Priority Data
Dec. 17, 2013   (JP) ................. 2013-260584

(51) Int. Cl.
  *H04W 36/30*   (2009.01)
  *H04W 36/02*   (2009.01)
  *H04W 36/00*   (2009.01)

(52) U.S. Cl.
  CPC ........ *H04W 36/02* (2013.01); *H04W 36/0055* (2013.01)

(58) Field of Classification Search
  CPC ...... H04W 36/02; H04W 36/04; H04W 36/30
  USPC .... 455/436, 456.5, 502, 524, 525, 560, 561; 370/331, 332, 304, 324, 350
  See application file for complete search history.

(56) References Cited

U.S. PATENT DOCUMENTS

| | | | |
|---|---|---|---|
| 8,594,069 B2* | 11/2013 | Ho | H04W 99/00 370/349 |
| 2005/0124345 A1* | 6/2005 | Laroia | H04W 36/06 455/437 |
| 2009/0061876 A1 | 3/2009 | Ho et al. | |
| 2009/0109926 A1* | 4/2009 | Meylan | H04W 36/02 370/331 |
| 2009/0181677 A1* | 7/2009 | Tanigawa | H04W 88/08 455/436 |
| 2009/0185539 A1 | 7/2009 | Ohta et al. | |
| 2010/0056151 A1* | 3/2010 | Veres | H04W 28/14 455/436 |
| 2010/0098024 A1* | 4/2010 | Nagatake | H04W 36/02 370/331 |
| 2011/0090871 A1* | 4/2011 | Kim | H04W 36/0044 370/332 |

FOREIGN PATENT DOCUMENTS

| | | |
|---|---|---|
| JP | 2010-536264 | 11/2010 |
| WO | 2008-053511 | 5/2008 |
| WO | 2009/021074 | 12/2009 |

* cited by examiner

Primary Examiner — Kamran Afshar
Assistant Examiner — Farid Seyedvosoghi
(74) Attorney, Agent, or Firm — Fujitsu Patent Center

(57) ABSTRACT

A base station apparatus acquires, when a handover from a first device in a base station apparatus to a second device in the base station apparatus occurs, handover source information related to data received by the first device after the handover. The base station apparatus calculates a time taken to transfer the data from the first device to the second device based on the acquired handover source information. The base station apparatus transfers the data during the calculated time.

4 Claims, 19 Drawing Sheets

FIG.6

| D/C | PDU TYPE | .... |
|---|---|---|
| HO CONTROL TYPE | | |

FIG.7

| ITEM NUMBER | ITEM | MEASURED VALUE | UNIT |
|---|---|---|---|
| 1 | HO DATA RECEPTION TIME | 1 | SECOND |
| 2 | HO DATA RECEIVED AMOUNT | 4 | K BYTE |
| 3 | HO TARGET AVERAGE RECEPTION RATE | 0.4 | Mbps |
| 4 | HO TARGET AVERAGE RECEIVED DATA | 6 | K BYTE |

FIG.13

| STATISTICAL INFORMATION ITEM | MEASURED VALUE | UNIT |
|---|---|---|
| PDCP SDU RECEPTION RATE | 10×10^6 | bps |
| NUMBER OF RECEIVED PDCP SDU | 91 | PKT |
| RETENTION AMOUNT OF PDCP SDU TO BE SUBJECT OF HO | 46592 | BYT |

FIG.14

| STATISTICAL INFORMATION ITEM | MEASURED VALUE | UNIT |
|---|---|---|
| HO SOURCE TRANSMISSION RATE | 5×10^6 | bps |
| AVERAGE TRANSMISSION DATA LENGTH | 512 | BYT |
| OLDEST TRANSMITTED SN IN BUFFER BEFORE HO | 91 | SN |

FIG.15

| STATISTICAL INFORMATION ITEM | MEASURED VALUE | UNIT |
|---|---|---|
| HO TARGET RECEPTION RATE | 5×10^6 | bps |
| AVERAGE RECEPTION DATA LENGTH | 512 | BYT |
| S1 RECEPTION FIRST SN | 201 | SN |
| ESTIMATED NUMBER OF TRANSMITTED S1 DATA | 109 | SN |

FIG.18

| D/C | PDU TYPE | .... |
|---|---|---|
| HO CONTROL TYPE ||||
| SN ||||
| HO TARGET RECEPTION RATE ||||

FIG.19

| D/C | PDU TYPE | .... |
|---|---|---|
| HO CONTROL TYPE ||||
| TIMER ||||
| HO SOURCE TRANSMISSION RATE ||||
| AVERAGE TRANSMISSION DATA LENGTH ||||
| ESTIMATED NUMBER OF TRANSMITTED S1 DATA ||||

FIG.21

| STATISTICAL INFORMATION ITEM | MEASURED VALUE | UNIT |
|---|---|---|
| HO TARGET RECEPTION RATE | 5×10^6 | bps |
| HO TARGET AVAILABLE BUFFER CAPACITY | 1×10^6 | BYT |

FIG.22

| D/C | PDU TYPE | .... |
|---|---|---|
| HO CONTROL TYPE | | |
| SN | | |
| HO TARGET RECEPTION RATE | | |
| HO TARGET AVAILABLE BUFFER CAPACITY | | |

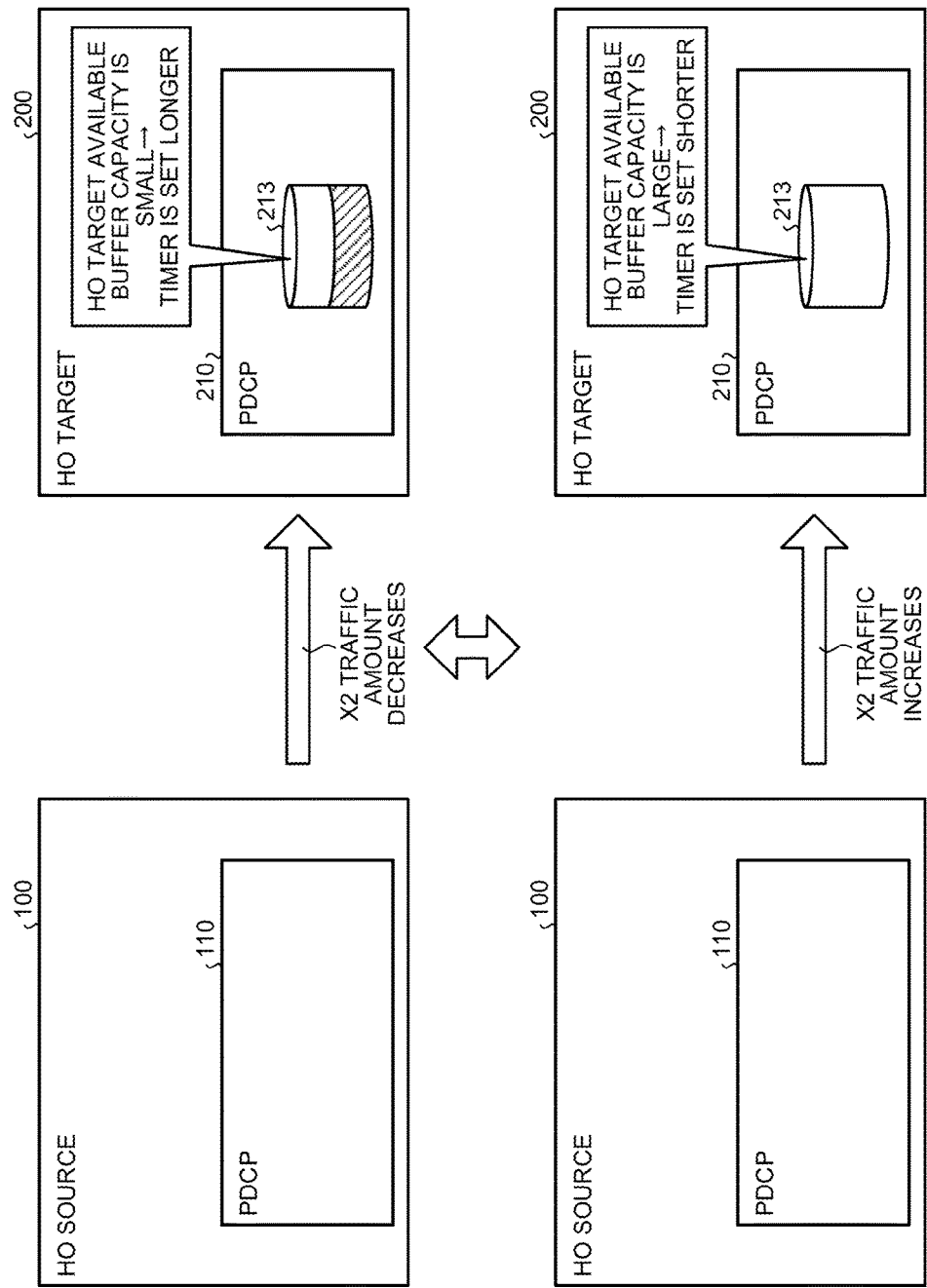

WIRELESS COMMUNICATION APPARATUS AND WIRELESS COMMUNICATION METHOD

CROSS-REFERENCE TO RELATED APPLICATION

This application is based upon and claims the benefit of priority of the prior Japanese Patent Application No. 2013-260584, filed on Dec. 17, 2013, the entire contents of which are incorporated herein by reference.

FIELD

The embodiments discussed herein are related to a wireless communication apparatus and a method for controlling a handover in a base station apparatus.

BACKGROUND

Base station apparatuses divide their coverage area of radio waves into a plurality of cells to control communications of a terminal device positioned in each cell using a baseband card and a unit. When the terminal device moves across cells, base station apparatuses perform a handover in the base station, such as a handover between baseband cards and a handover between units, thereby continuing the communications.

When a handover target device receives a handover start message, for example, the device starts a data transfer end monitoring timer. The device receives transfer data transferred from a handover source device while the timer is operating. When the data transfer end monitoring timer expires, the handover target device stops receiving the data and completes the handover.

Patent literature 1: Japanese National Publication of International Patent Application No. 2010-536264
Patent literature 2: International Publication Pamphlet No. WO 2008/053511

In a case where a handover in a base station apparatus occurs, the conventional technologies have low communication efficiency of transferring data received by the handover source after the handover to the handover target. This leads to delay in handover processing.

In the handover target device, for example, the data transfer end monitoring timer for each user terminal is not set. To prevent loss of transfer data in a handover, the handover target device sets a sufficient time. This possibly prevents the handover target device from finishing the handover processing because the data transfer end monitoring timer does not expire despite completion of data transfer in a case where the data transfer is small.

SUMMARY

According to an aspect of the embodiment, a wireless communication apparatus includes an acquiring unit that acquires, when a handover from a first device to a second device occurs in a base station apparatus including the first device and the second device communicable with a terminal device, handover source information related to data received by the first device after the handover; a calculating unit that calculates a time taken to transfer the data from the first device to the second device based on the handover source information acquired by the acquiring unit; and a transfer unit that transfers the data during the time calculated by the calculating unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an example diagram of a format of control PDU transmitted from an HO source to an HO target according to the first embodiment;
FIG. 7 is an example diagram of statistical information acquired by the HO target according to the first embodiment;
FIG. 13 is an example diagram of statistical information on data received by an HO source from a host apparatus according to the second embodiment;
FIG. 14 is an example diagram of statistical information on data transmitted from the HO source to an HO target according to the second embodiment;
FIG. 15 is an example diagram of statistical information acquired by the HO target according to the second embodiment;
FIG. 18 is an example diagram of a format of control PDU transmitted from an HO target to an HO source according to the third embodiment;
FIG. 19 is an example diagram of a format of control PDU transmitted from the HO source to the HO target according to the third embodiment;
FIG. 21 is an example diagram of statistical information acquired by an HO target according to a fourth embodiment;
FIG. 22 is an example diagram of a format of control PDU transmitted from the HO target to an HO source according to the fourth embodiment;
FIG. 24 is a diagram for explaining timer setting according to the fourth embodiment.

DESCRIPTION OF EMBODIMENTS

Preferred embodiments will be explained with reference to accompanying drawings. The embodiments are not intended to limit the present invention and may be optionally combined as long as no inconsistency arises.

[a] First Embodiment

Example of an Entire Configuration

Figure 1:
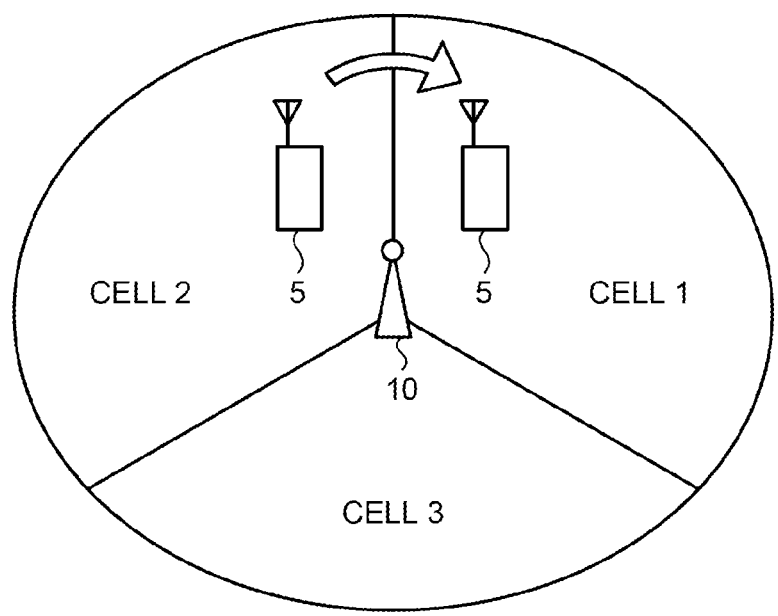
FIG. 1 is an example diagram of an entire configuration of a system according to a first embodiment.

FIG. 1 is an example diagram of an entire configuration of a system according to a first embodiment. As illustrated in FIG. 1, a wireless communication system includes a base station apparatus 10 and a terminal device 5. The base station apparatus 10 is a system that divides its coverage area of radio waves into a cell 1, a cell 2, and a cell 3 to control wireless communications of the terminal device 5 in each cell.

The terminal device 5 is a terminal that performs wireless communications, such as a mobile phone and a smartphone. The number of base station apparatuses, terminal devices, and cells are given by way of example and are not limited thereto.

If the terminal device 5 positioned in the cell 2 moves to the cell 1 in this state, the base station apparatus 10 performs a handover (which may be hereinafter referred to as "HO"), thereby continuing the wireless communications of the terminal device 5. Specifically, the base station apparatus 10 predicts a time taken for a first device and a second device that perform a handover in the base station apparatus to transfer data in the handover based on statistical information. The base station apparatus 10 transfers data during the predicted time. Thus, the base station apparatus 10 can improve the communication efficiency.

Example of a Handover

A handover in the base station apparatus will be described. Examples of the handover in the base station apparatus 10 may include a handover between cards and a handover between units.

Figure 2:
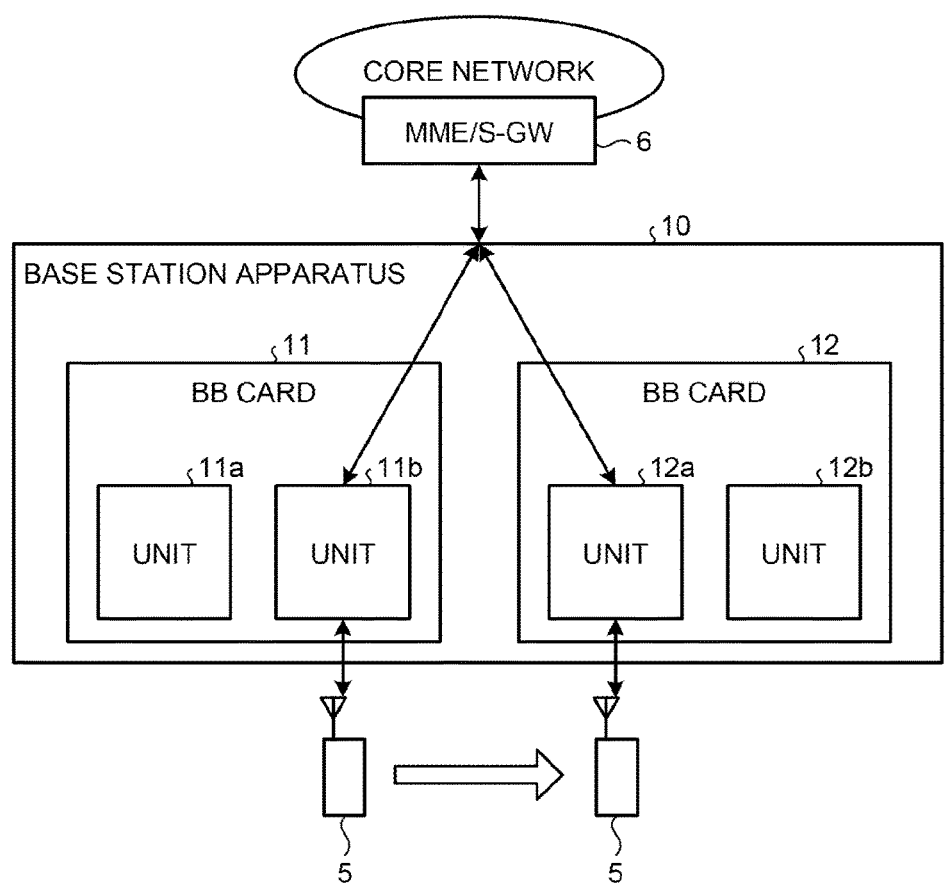
FIG. 2 is a diagram for explaining a handover between cards.

FIG. 2 is a diagram for explaining a handover between cards. As illustrated in FIG. 2, the base station apparatus 10 includes a baseband (BB) card 11 and a BB card 12 that perform baseband processing. The BB card 11 includes a unit 11a and a unit 11b, whereas the BB card 12 includes a unit 12a and a unit 12b. One cell is allocated to a unit, for example.

The base station apparatus 10 relays data communications between a mobility management entity (MME)/serving-gateway (S-GW) 6, which is a host apparatus, and the terminal device 5 via the unit 11b of the BB card 11. The data relayed at this time is transmitted and received in a control plane (C-plane) or a user plane (U-plane), for example. The data may be referred to as "S1 data" or "PDCP SDU" in the present embodiment.

When the terminal device 5 moves from a cell managed by the unit 11b of the BB card 11 to a cell managed by the unit 12a of the BB card 12, the terminal device 5 causes a handover. As a result, the base station apparatus 10 switches the connection destination of the terminal device 5 to the unit 12a of the BB card 12. Thus, the base station apparatus 10 controls the communications between the MME/S-GW 6 and the terminal device 5 with the unit 12a of the BB card 12.

Figure 3:
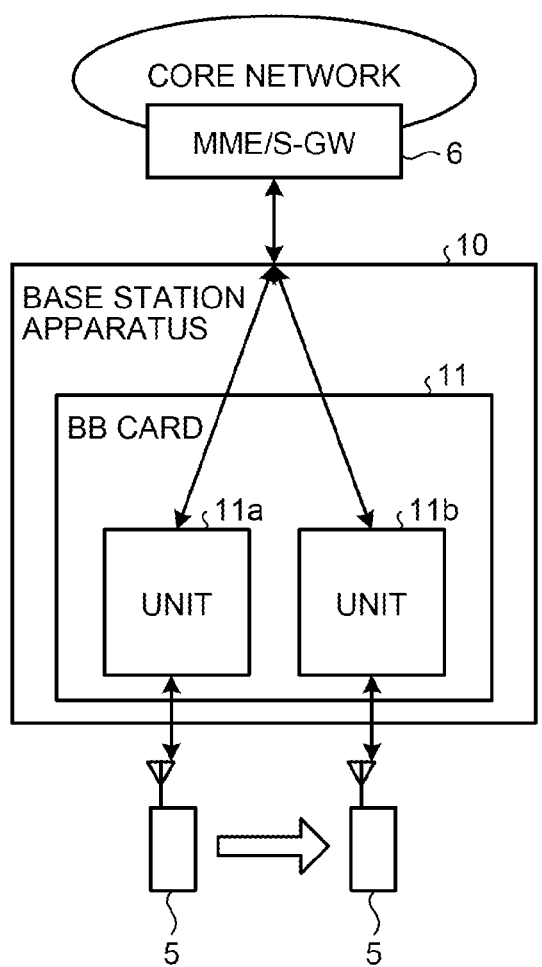
FIG. 3 is a diagram for explaining a handover between units.

FIG. 3 is a diagram for explaining a handover between units. The base station apparatus 10 relays data communications between the MME/S-GW 6 and the terminal device 5 via the unit 11a of the BB card 11. When the terminal device 5 moves from a cell managed by the unit 11a of the BB card 11 to a cell managed by the unit 11b, the terminal device 5 causes a handover. As a result, the base station apparatus 10 switches the connection destination of the terminal device 5 to the unit 11b of the BB card 11. Thus, the base station apparatus 10 controls the communications between the MME/S-GW 6 and the terminal device 5 with the unit 11b.

Hardware Configuration

Figure 4:
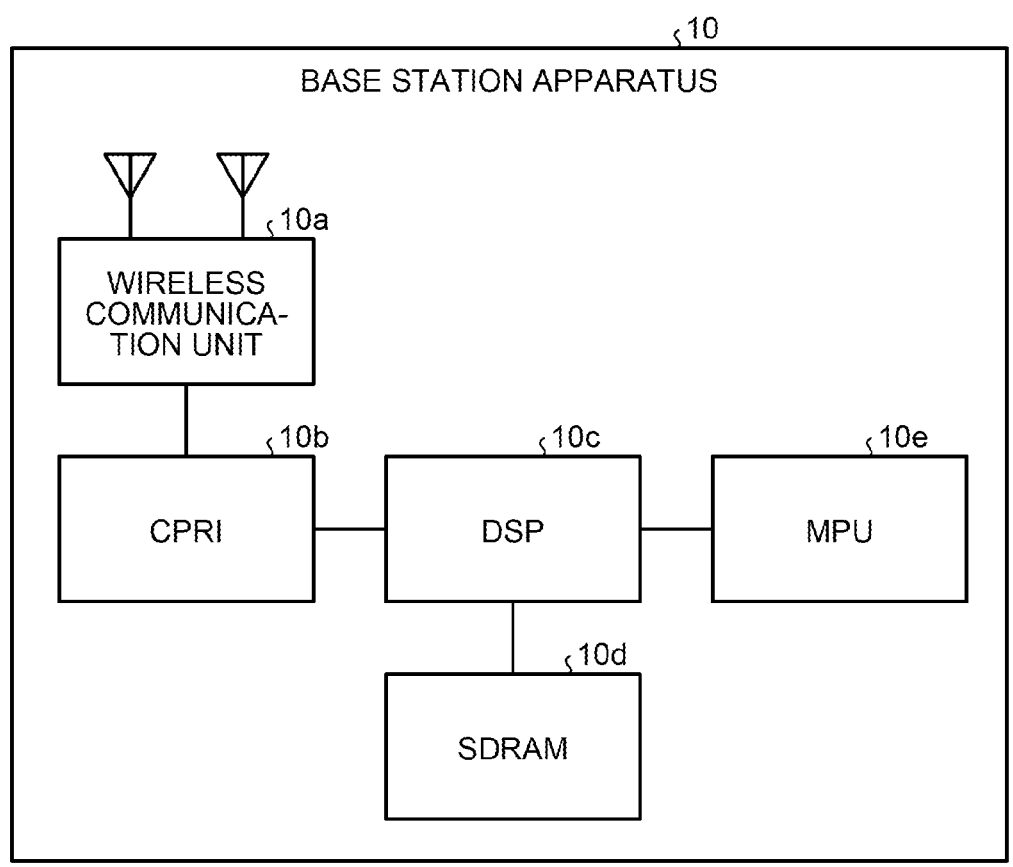
FIG. 4 is an example diagram of a hardware configuration of a base station apparatus according to the first embodiment.

FIG. 4 is an example diagram of a hardware configuration of the base station apparatus according to the first embodiment. As illustrated in FIG. 4, the base station apparatus 10 includes a wireless communication unit 10a, a common public radio interface (CPRI) 10b, and a digital signal processor (DSP) 10c. The base station apparatus 10 further includes a synchronous dynamic random access memory (SDRAM) 10d and a micro-processing unit (MPU) 10e.

The wireless communication unit 10a controls wireless communications with other devices. The wireless communication unit 10a, for example, receives S1 data or the like from the MME/S-GW 6 and receives various types of packets from the terminal device 5. The CPRI 10b is an interface that connects the wireless communication unit 10a and the DSP 10c.

The DSP 10c performs wireless signal processing relating to wireless communications, such as call control, transmission and reception control, and baseband processing. The SDRAM 10d is an example of a memory included in the base station apparatus 10 and stores therein various types of data and information relating to wireless communications. The MPU 10e is a processing unit that conducts whole processing of the base station apparatus 10 and performs various types of processing, which will be described later with reference to FIG. 5 and figures subsequent thereto.

Functional Configuration of the Base Station Apparatus

Figure 5:
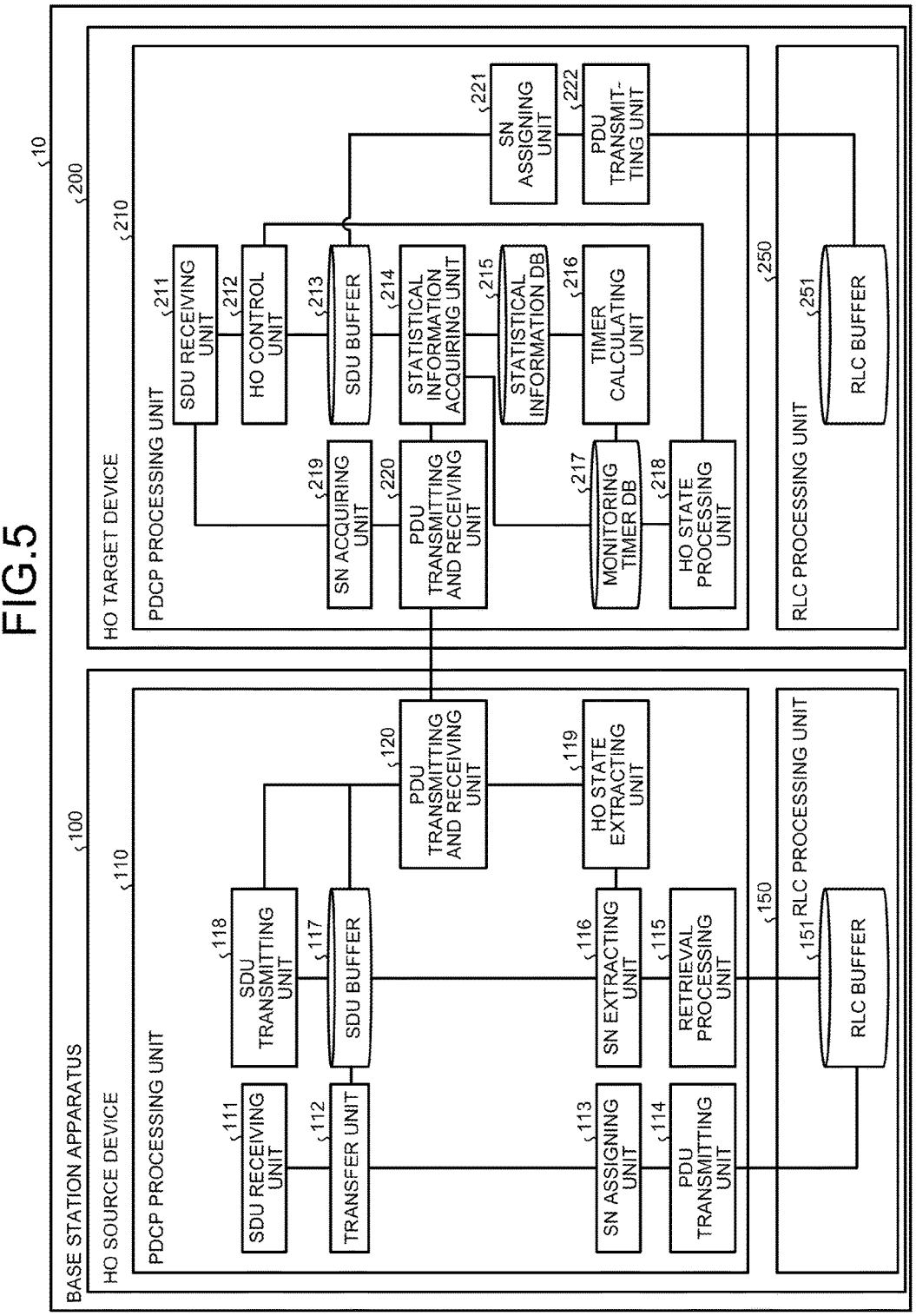
FIG. 5 is a functional block diagram of a functional configuration of the base station apparatus according to the first embodiment.

FIG. 5 is a functional block diagram of a functional configuration of the base station apparatus according to the first embodiment. As illustrated in FIG. 5, the base station apparatus 10 includes an HO source device 100 and an HO target device 200. The HO source device 100 and the HO target device 200 correspond to a BB card or a unit.

Each processing unit illustrated in FIG. 5 is a processing unit provided by the MPU 10e and the DSP 10c illustrated in FIG. 4 or an electronic circuit included in the MPU 10e and the DSP 10c, for example. An MPU and a DSP may be provided for each device or unit. While the HO source device 100 and the HO target device 200 have the same configuration, they are explained separately as the HO source device and the HO target device.

HO Source Device

As illustrated in FIG. 5, the HO source device 100 includes a packet data convergence protocol (PDCP) processing unit 110 and a radio link control (RLC) processing unit 150.

The PDCP processing unit 110 performs processing relating to PDCP serving as a layer 2 and performs header compression, secrecy processing, and integrity protection, for example. The PDCP processing unit 110 includes a service data unit (SDU) receiving unit 111, a transfer unit 112, a sequential number (SN) assigning unit 113, and a protocol data unit (PDU) transmitting unit 114. The PDCP processing unit 110 further includes a retrieval processing unit 115, an SN extracting unit 116, an SDU buffer 117, an SDU transmitting unit 118, an HO state extracting unit 119, and a PDU transmitting and receiving unit 120.

The SDU receiving unit 111 is a processing unit that receives "PDCP SDU", which is data transmitted and received in a control plane or a user plane, from the MME/S-GW 6. S1 data, for example, is assigned with a sequential number allocated in order of being transmitted from the MME/S-GW 6.

The transfer unit 112 is a processing unit that transfers "PDCP SDU" received by the SDU receiving unit 111 to the SN assigning unit 113. The transfer unit 112 stores "PDCP SDU" received by the SDU receiving unit 111 in the SDU buffer 117 while a handover is occurring.

The SN assigning unit 113 is a processing unit that assigns a sequential number to "PDCP SDU" transferred from the transfer unit 112 in order of being transferred and transmits the "PDCP SDU" to the PDU transmitting unit 114. The SN assigning unit 113, for example, adds "PDCP header" containing a sequential number indicating an order of being transmitted to the RLC processing unit 150 to "PDCP SDU", thereby generating "PDCP PDU". The SN assigning unit 113 then transmits the "PDCP PDU" to the PDU transmitting unit 114.

The PDU transmitting unit 114 is a processing unit that transmits "PDCP PDU" assigned with a sequential number to the RLC processing unit 150 in order of the sequential number assigned by the SN assigning unit 113.

The retrieval processing unit 115 retransfers "PDCP PDU" stored in an RLC buffer 151 to the PDCP processing unit 110 when a handover occurs. The retrieval processing unit 115, for example, reads "PDCP PDU" from the RLC buffer 151 of the RLC processing unit 150 and outputs the "PDCP PDU" to the SN extracting unit 116.

The SN extracting unit 116 is a processing unit that extracts a sequential number originally assigned to "PDCP SDU" from "PDCP PDU" read from the retrieval processing unit 115 and transmits the sequential number to the HO state extracting unit 119. The SN extracting unit 116 also extracts "SDU" from the "PDCP PDU" read from the retrieval processing unit 115 and stores it in the SDU buffer 117.

The SDU buffer 117 is a storage device that stores therein "PDCP SDU" received from the MME/S-GW 6 while a handover is occurring. In other words, the SDU buffer 117 stores therein S1 data yet to be transmitted to the terminal device 5 despite being received from the MME/S-GW 6 because of a handover.

The SDU transmitting unit 118 is a processing unit that reads "PDCP SDU" stored in the SDU buffer 117 and transmits it to the HO target device 200. When the SDU receiving unit 111 receives a message indicating start of a handover transmitted by the MME/S-GW 6 and the handover is started, for example, the SDU transmitting unit 118 reads "PDCP SDU" from the SDU buffer 117 and transmits it to the HO target device 200.

The SDU transmitting unit 118 reads "PDCP SDU" in order of being stored in the SDU buffer 117 and transmits it to the HO target device 200. In other words, the SDU transmitting unit 118 transmits "PDCP SDU" in order of the sequential number assigned thereto to the HO target device 200.

The HO state extracting unit 119 is a processing unit that extracts an HO state based on the sequential number extracted from the SN extracting unit 116. The HO state extracting unit 119, for example, manages the sequential number extracted from the SN extracting unit 116, thereby determining the number of "PDCP SDU" retrieved from the RLC processing unit 150. The HO state extracting unit 119 then transmits the sequential number of the last "PDCP SDU" retrieved from the RLC processing unit 150 to the PDU transmitting and receiving unit 120.

The PDU transmitting and receiving unit 120 is a processing unit that transmits and receives control PDU to and from the HO target device 200. The PDU transmitting and receiving unit 120 acquires and retains, from the HO state extracting unit 119, the sequential number of the last "PDCP SDU" retrieved from the RLC processing unit 150, for example. The PDU transmitting and receiving unit 120 also monitors "PDCP SDU" transmitted from the SDU transmitting unit 118.

The PDU transmitting and receiving unit 120 detects "PDCP SDU" corresponding to the last sequential number is transmitted from the RLC processing unit 150. The PDU transmitting and receiving unit 120 then transmits control PDU to the HO target device 200.

FIG. 6 is an example diagram of a format of control PDU transmitted from the HO source to the HO target according to the first embodiment. As illustrated in FIG. 6, the control PDU includes "D/C, PDU Type, and HO Control TYPE", for example.

"D/C" is information indicating whether the PDU is data PDU or control PDU and is set to "1" in the case of control PDU. "PDU Type" is information indicating the type of the PDU and is set to "0" in the case of control PDU. "HO Control TYPE" is information for identifying control PDU in a handover and is set to "1" in the case of control PDU.

The RLC processing unit 150 is a processing unit that performs processing relating to RLC serving as the layer 2 and transfers data resulting from conversion into a format corresponding to a service between the terminal device 5 and the base station apparatus 10. The RLC processing unit 150, for example, performs processing of the layer 2 specified in 3GPP TS36.322, such as establishment of a communication line between the terminal device 5 and the base station apparatus 10 and automatic repeat-request (ARQ).

The RLC processing unit 150 includes the RLC buffer 151. The RLC buffer 151 stores therein "PDCP PDU" output from the PDCP processing unit 110. In other words, the RLC processing unit 150 stores therein "PDCP PDU" to which "PDCP header" containing the sequential number is added as "RLC SDU".

HO Target Device

As illustrated in FIG. 5, the HO target device 200 includes a PDCP processing unit 210 and an RLC processing unit 250. The PDCP processing unit 210 is identical to the PDCP processing unit 110 of the HO source device 100 and performs processing relating to PDCP serving as the layer 2.

The PDCP processing unit 210 includes an SDU receiving unit 211, an HO control unit 212, an SDU buffer 213, a statistical information acquiring unit 214, a statistical information DB 215, a timer calculating unit 216, a monitoring timer DB 217, and an HO state processing unit 218. The PDCP processing unit 210 further includes an SN acquiring unit 219, a PDU transmitting and receiving unit 220, an SN assigning unit 221, and a PDU transmitting unit 222.

The SDU receiving unit 211 is a processing unit that receives "PDCP SDU", which is data in the control plane or the user plane, from the MME/S-GW 6 or the HO source device 100. In other words, the SDU receiving unit 211 receives S1 data when a handover is started.

The HO control unit 212 is a processing unit that controls various types of processing depending on the HO state. When the SDU receiving unit 111 receives a message indicating start of a handover transmitted by the MME/S-GW 6, for example, the HO control unit 212 starts handover processing. The HO control unit 212 then stores "PDCP SDU" received by the SDU receiving unit 211 in the SDU buffer 213.

When the HO state processing unit 218 notifies the HO control unit 212 of expiration of a timer, the HO control unit 212 finishes the handover processing and performs normal processing on the terminal device 5 connected by the handover.

The SDU buffer 213 is a storage device that stores therein "PDCP SDU" received from the HO source device 100 and "PDCP SDU" received from the MME/S-GW 6 while a handover is occurring. In other words, the SDU buffer 213 stores therein S1 data stored in the HO source device 100 when a handover occurs and S1 data transmitted by the MME/S-GW 6 while a handover is occurring.

The statistical information acquiring unit 214 is a processing unit that acquires, when a handover from the HO source device 100 to the HO target device 200 occurs, handover source information on "PDCP SDU" received by the HO source device 100 after the handover. Specifically, the statistical information acquiring unit 214 acquires and stores the information illustrated in FIG. 7 in the statistical information DB 215.

FIG. 7 is an example diagram of statistical information acquired by the HO target according to the first embodiment. As illustrated in FIG. 7, the statistical information acquiring unit 214 acquires "an HO data reception time, an HO data received amount, an HO target average reception rate, and HO target average received data" based on information, a state, and the like of S1 data received from the HO source.

The "HO data reception time" is a time from when the PDU transmitting and receiving unit 220 receives control PDU to when a data transfer monitoring timer expires. The "HO data received amount" is an amount of data received by the SDU receiving unit 211 from when the PDU transmitting and receiving unit 220 receives the control PDU to when the data transfer monitoring timer expires. The "HO target average reception rate" is an average value of "HO data received amount/HO data reception time" and "HO data received amount/HO data reception time" in previous handovers. The "HO target average received data" is an average value of the "HO data received amount" and the "HO data received amount" in previous handovers.

In the example in FIG. 7, the statistical information acquiring unit 214 determines a timer value set in this handover to be "one second". The statistical information acquiring unit 214 determines the "HO data received amount" in this handover to be "4 K bytes". The statistical information acquiring unit 214 determines the "HO target average reception rate" from this handover to a certain number of previous handovers to be "0.4 Mbps". The statistical information acquiring unit 214 determines the "HO data received amount" from this handover to the certain number of previous handovers to be "6 K bytes". The number of pieces of information on previous handovers to use can be optionally changed.

The statistical information DB 215 is a storage device that stores therein statistical information acquired by the statistical information acquiring unit 214. Specifically, the statistical information DB 215 stores therein the statistical information illustrated in FIG. 7. The statistical information DB 215 also stores therein statistical information acquired in previous handovers. The statistical information DB 215, for example, stores therein previous statistical information in association with the handover source.

The timer calculating unit 216 is a processing unit that calculates a time taken to transfer data from the HO source device 100 to the HO target device 200 based on the statistical information acquired by the statistical information acquiring unit 214. Specifically, the timer calculating unit 216 uses the statistical information stored in the statistical information DB 215 to calculate a data transfer monitoring timer value to be used when another handover occurs after this handover. The timer calculating unit 216 stores the result in the monitoring timer DB 217.

An explanation will be made using FIG. 7 as an example. The timer calculating unit 216 calculates "data transfer end monitoring timer value=HO target average received data/HO target average reception rate=(6000×8)/(0.4×100000) =0.12 (sec)". The timer calculating unit 216 then stores "120 msecs" in the monitoring timer DB 217 as the "data transfer end monitoring timer".

The monitoring timer DB 217 is a storage device that stores therein the data transfer end monitoring timer value calculated by the timer calculating unit 216 and is updated by the timer calculating unit 216. In the example above, the monitoring timer DB 217 stores therein "120 msecs" as the "data transfer end monitoring timer".

The HO state processing unit 218 monitors the data transfer end monitoring timer. When the PDU transmitting and receiving unit 220 receives control PDU after a handover is started, for example, the HO state processing unit 218 starts the data transfer end monitoring timer. Subsequently, when the data transfer end monitoring timer reaches the timer value stored in the monitoring timer DB 217, the HO state processing unit 218 determines that the timer expires and notifies the HO control unit 212 of the end of HO.

When being notified of the end of HO, the HO control unit 212 finishes transferring data from the HO source and performs normal processing. Thus, the data is transferred from the HO source to the HO target during a time corresponding to the timer value calculated by the timer calculating unit 216.

The SN acquiring unit 219 is a processing unit that acquires a sequential number assigned to "PDCP SDU" received from the MME/S-GW 6 during a handover. The SN acquiring unit 219, for example, acquires "SN: 201" assigned to S1 data received from the MME/S-GW 6 while "PDCP SDU" is being received from the HO source device 100. The SN acquiring unit 219 then outputs "SN: 201" to the PDU transmitting and receiving unit 220.

The PDU transmitting and receiving unit 220 is a processing unit that transmits and receives control PDU to and from the HO source device 100. When transmission of "PDCP SDU" received by the HO source device 100 before the handover is completed, for example, the PDU transmitting and receiving unit 220 receives control PDU from the HO source device 100.

When receiving "PDCP SDU" from the MME/S-GW 6 during the handover, the PDU transmitting and receiving unit 220 transmits control PDU including an "SN value" assigned to the "PDCP SDU" to the HO source device 100. In the example above, the PDU transmitting and receiving unit 220 transmits control PDU including "SN: 201" acquired by the SN acquiring unit 219 to the HO source device 100.

The SN assigning unit 221 is a processing unit that assigns a sequential number to "PDCP SDU" stored in the SDU buffer 213 in order of being received and transmits the "PDCP SDU" to the PDU transmitting unit 222. The SN assigning unit 221, for example, adds "PDCP header" containing a sequential number indicating an order of being transmitted to the RLC processing unit 250 to "PDCP SDU", thereby generating "PDCP PDU". The SN assigning unit 221 then transmits the "PDCP PDU" to the PDU transmitting unit 222.

The PDU transmitting unit 222 is a processing unit that transmits "PDCP PDU" assigned with a sequential number to the RLC processing unit 250 in order of the sequential number assigned by the SN assigning unit 221.

Similarly to the RLC processing unit 150 of the HO source device 100, the RLC processing unit 250 is a processing unit that performs processing relating to RLC serving as the layer 2 and transfers data resulting from conversion into a format corresponding to a service between the terminal device 5 and the base station apparatus 10.

The RLC processing unit 250 includes an RLC buffer 251. The RLC buffer 251 stores therein "PDCP PDU" output from the PDCP processing unit 210. In other words, the RLC processing unit 250 stores therein "PDCP PDU" to which "PDCP header" containing the sequential number is added as "RLC SDU".

Timer Setting

Figure 8:
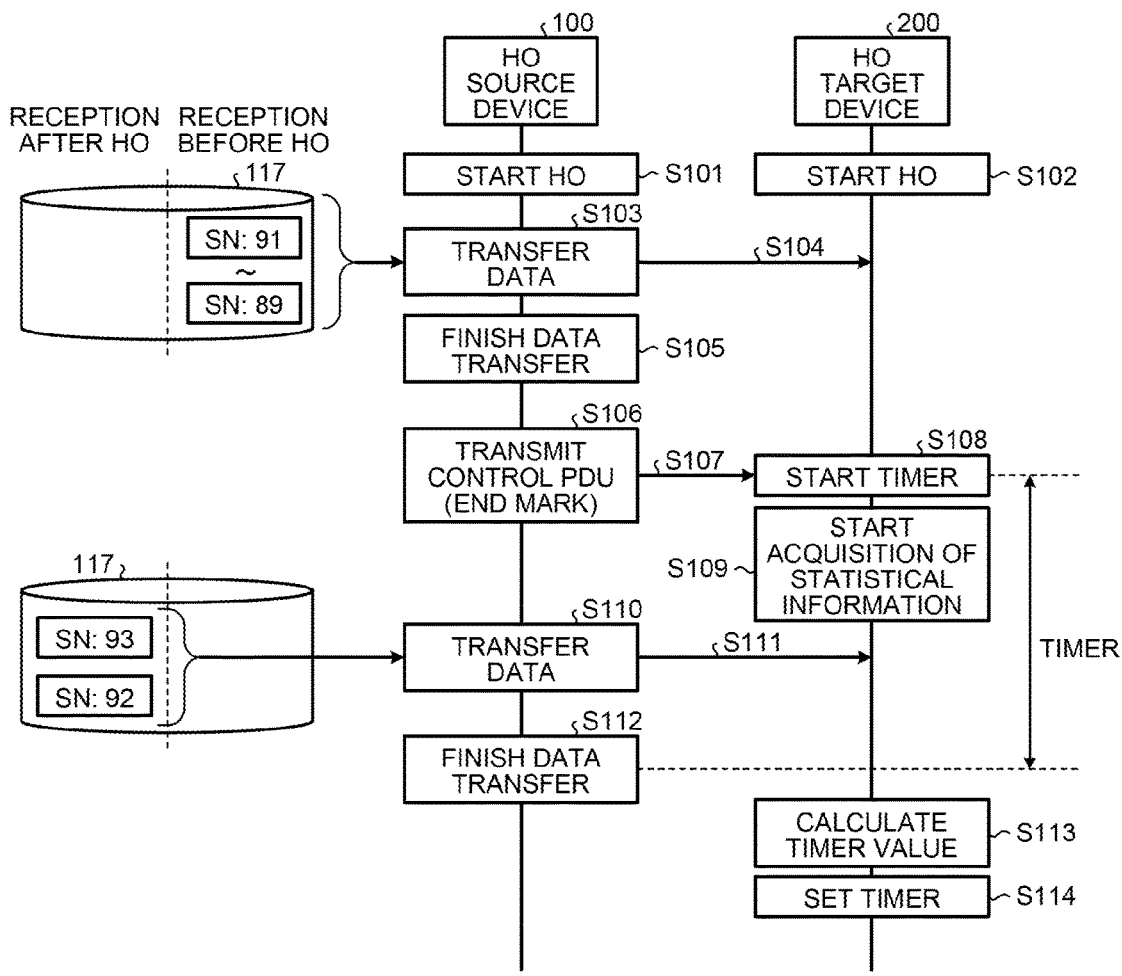
FIG. 8 is a diagram for explaining timer setting according to the first embodiment.

FIG. 8 is a diagram for explaining timer setting according to the first embodiment. As illustrated in FIG. 8, if the HO source device 100 receives a message indicating start of HO from the MME/S-GW 6, the HO source device 100 starts HO (S101). Similarly, if the HO target device 200 receives a message indicating start of HO from the MME/S-GW 6, the HO target device 200 starts HO (S102).

The SDU transmitting unit 118 of the HO source device 100 that starts the HO transfers "PDCP SDU" received before the start of HO and stored in the SDU buffer 117 to the HO target device 200 in order of the sequential number (S103 and S104). In the example in FIG. 8, the HO source device 100 transfers "PDCP SDU" of "SN: 89" to "PDCP SDU" of "SN: 91" stored therein to the HO target device 200 in order from "PDCP SDU" of "SN: 89".

If data transfer of "PDCP SDU" received before the start of HO is completed (S105), the PDU transmitting and receiving unit 120 of the HO source device 100 transmits control PDU to the HO target device 200 (S106 and S107). The transmitted control PDU serves as an end mark indicating completion of data transfer of "PDCP SDU" received before the start of HO.

If the control PDU serving as an end mark is received, the HO state processing unit 218 of the HO target device 200 starts the data transfer end monitoring timer (S108). The statistical information acquiring unit 214 starts to acquire statistical information (S109).

Subsequently, the SDU transmitting unit 118 of the HO source device 100 transfers "PDCP SDU" received after the start of HO to the HO target device 200 in order of the sequential number (S110 and S111). Thus, the HO source device 100 completes data transfer (S112). In the example in FIG. 8, the HO source device 100 transfers "PDCP SDU" of "SN: 92" and "PDCP SDU" of "SN: 93" stored therein to the HO target device 200 in order from "PDCP SDU" of "SN: 92".

Subsequently, the timer calculating unit 216 of the HO target device 200 calculates a timer value of the data transfer end monitoring timer based on the statistical information acquired by the statistical information acquiring unit 214 (S113) and sets the timer value in the monitoring timer DB 217 (S114). The set timer value is a value for predicting a time from S107 to S112 and is used in a subsequent handover.

Flow of Processing

Figure 9:
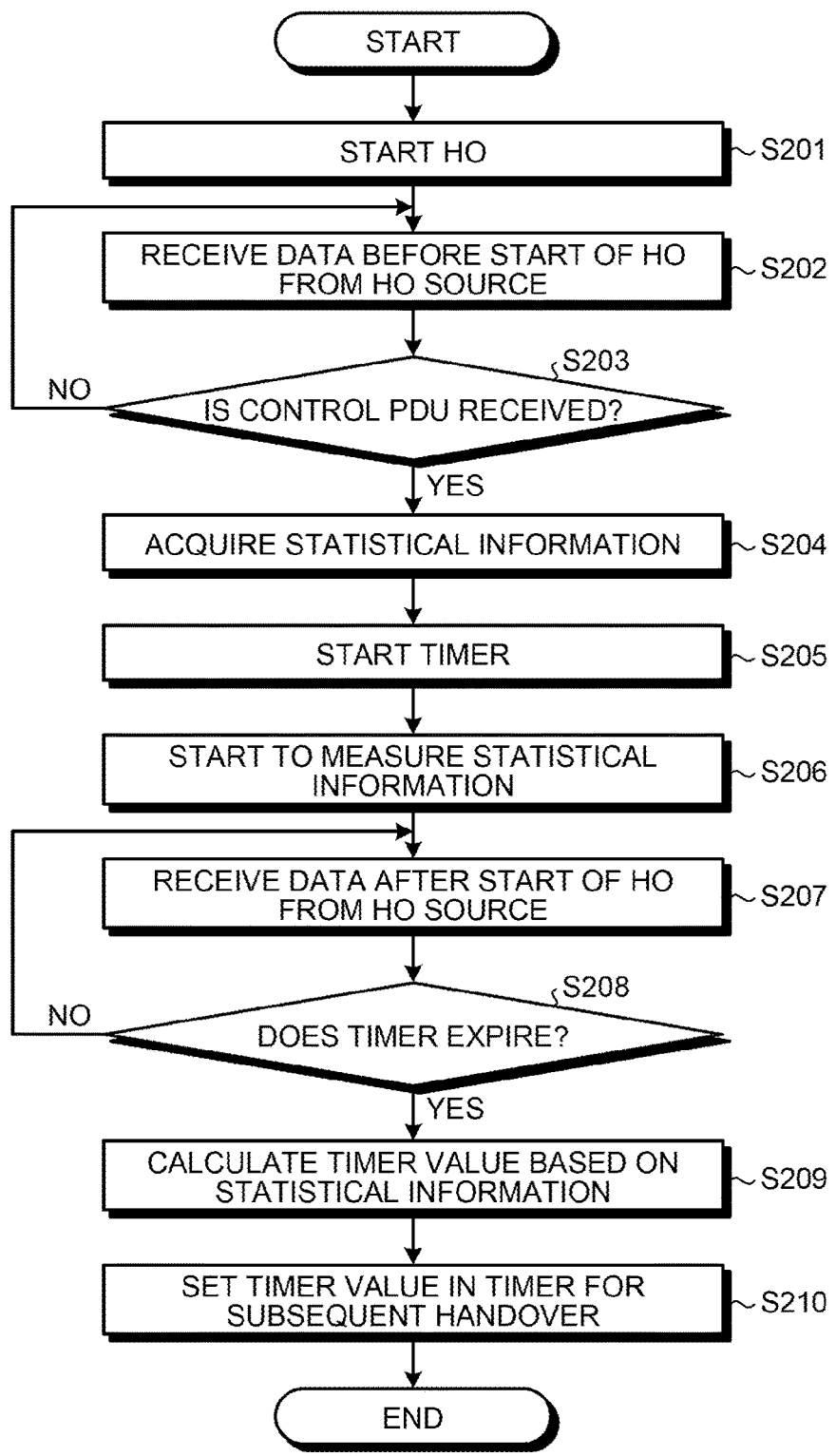
FIG. 9 is a flowchart of processing performed by the base station apparatus according to the first embodiment.

FIG. 9 is a flowchart of processing performed by the base station apparatus according to the first embodiment. As illustrated in FIG. 9, if the base station apparatus 10 starts a handover (S201), the base station apparatus 10 causes the HO target device 200 to receive data received by the HO source device 100 before the start of HO (S202).

If the HO target device 200 receives control PDU (Yes at S203), the base station apparatus 10 acquires statistical information stored in the statistical information DB 215 in the HO target device 200 (S204). The base station apparatus 10 then starts the data transfer end monitoring timer (S205) and starts to measure statistical information (S206).

Subsequently, the base station apparatus 10 causes the HO target device 200 to receive data received by the HO source device 100 after the start of HO (S207). If the data transfer end monitoring timer expires (Yes at S208), the base station apparatus 10 calculates a timer value based on the acquired statistical information (S209).

The base station apparatus 10 sets the calculated timer value in the data transfer end monitoring timer for a subsequent handover (S210). Specifically, the base station apparatus 10 updates a timer value stored in the monitoring timer DB 217 with the calculated timer value.

Advantageous Effects

As described above, the base station apparatus 10 can optimize the data transfer end monitoring timer depending on the data transfer amount for each terminal device 5. The base station apparatus 10 can reduce an unnecessary value of the data transfer end monitoring timer and reduce a time difference between data transfer completion time and the data transfer end monitoring timer. Thus, the base station apparatus 10 can reduce an HO processing time.

Because of reduction in the HO processing time, the base station apparatus 10 can reduce central processing unit (CPU) utilization and power consumption. Furthermore, the base station apparatus 10 can reduce a time difference between the data transfer completion time and the data transfer end monitoring timer, making it possible to complete HO earlier. Therefore, the base station apparatus 10 can shorten a time until transmission of user data is resumed.

[b] Second Embodiment

The first embodiment has described an example where the monitoring timer for a subsequent handover is calculated. The embodiment, however, is not limited thereto, and the monitoring timer may be set in real time. A second embodiment describes an example where a monitoring timer is set in real time during a handover.

Example of an Entire Configuration

Figure 10:
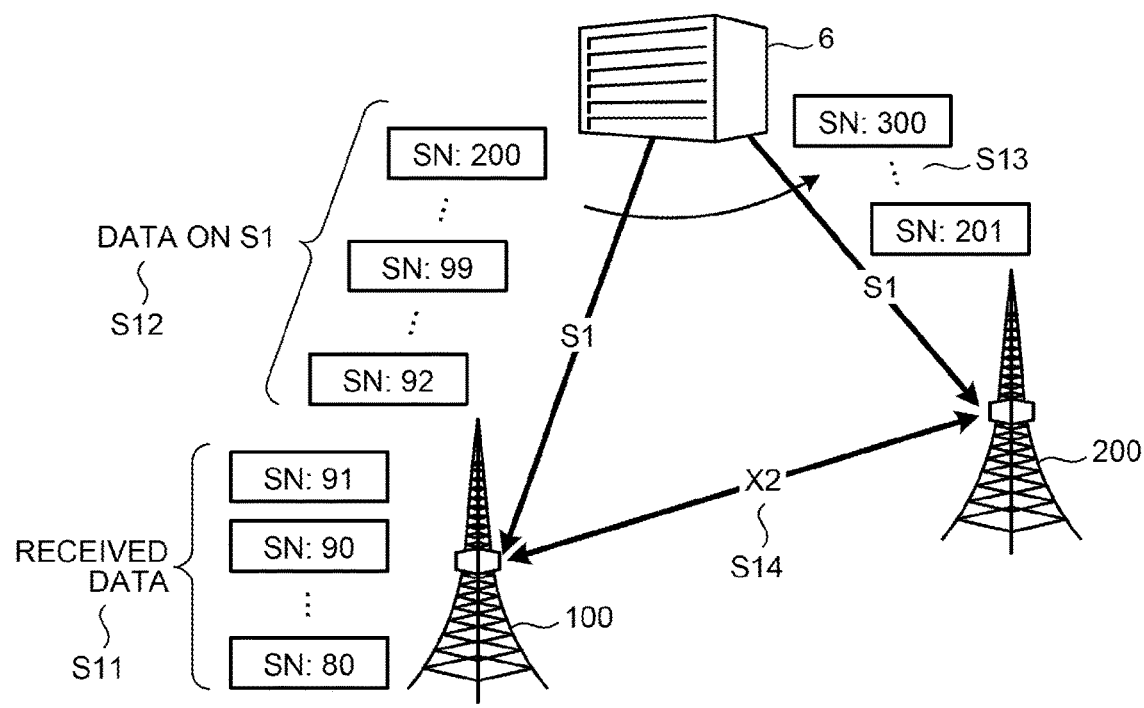
FIG. 10 is a diagram for explaining a state of a handover according to a second embodiment.

FIG. 10 is a diagram for explaining a state of a handover according to the second embodiment. Similarly to the first embodiment, an HO source device 100 and an HO target device 200 are connected to an MME/S-GW 6 via an S1 line and receive S1 data from the MME/S-GW 6 as illustrated in FIG. 10. The HO source device 100 and the HO target device 200 are connected via an X2 line.

If HO started in this state, the HO source device 100 starts to transfer data already received by the HO source to the HO target and measures statistical information in the data transfer (S11).

In response to the start of HO, a path from the MME/S-GW 6 to the HO source device 100 is switched to a path to the HO target device 200. Data already transferred to the HO source device 100 on the S1 is not retransferred to the HO target device 200 on the S1 (S12). By contrast, the HO target device receives S1 data transmitted from the MME/S-GW 6 after the path is switched during the HO (S13).

At a timing when a buffer storing therein data received before the HO empties, the HO source device 100 transmits control PDU to the HO target device 200. At this time, the HO source device 100 transmits the control PDU together with SN information (SN: 91) of the last received data before the HO (S14).

The HO target device 200 uses statistical information received from the HO source device 100 and statistical information acquired by the HO target device 200 itself to calculate a timer value. Subsequently, the HO target device 200 sets a data transfer end monitoring timer and receives data transferred from the HO source device 100 until the timer expires. Thus, the HO target device 200 can set the data transfer end monitoring timer in real time during the handover.

Timer Setting

Figure 11:
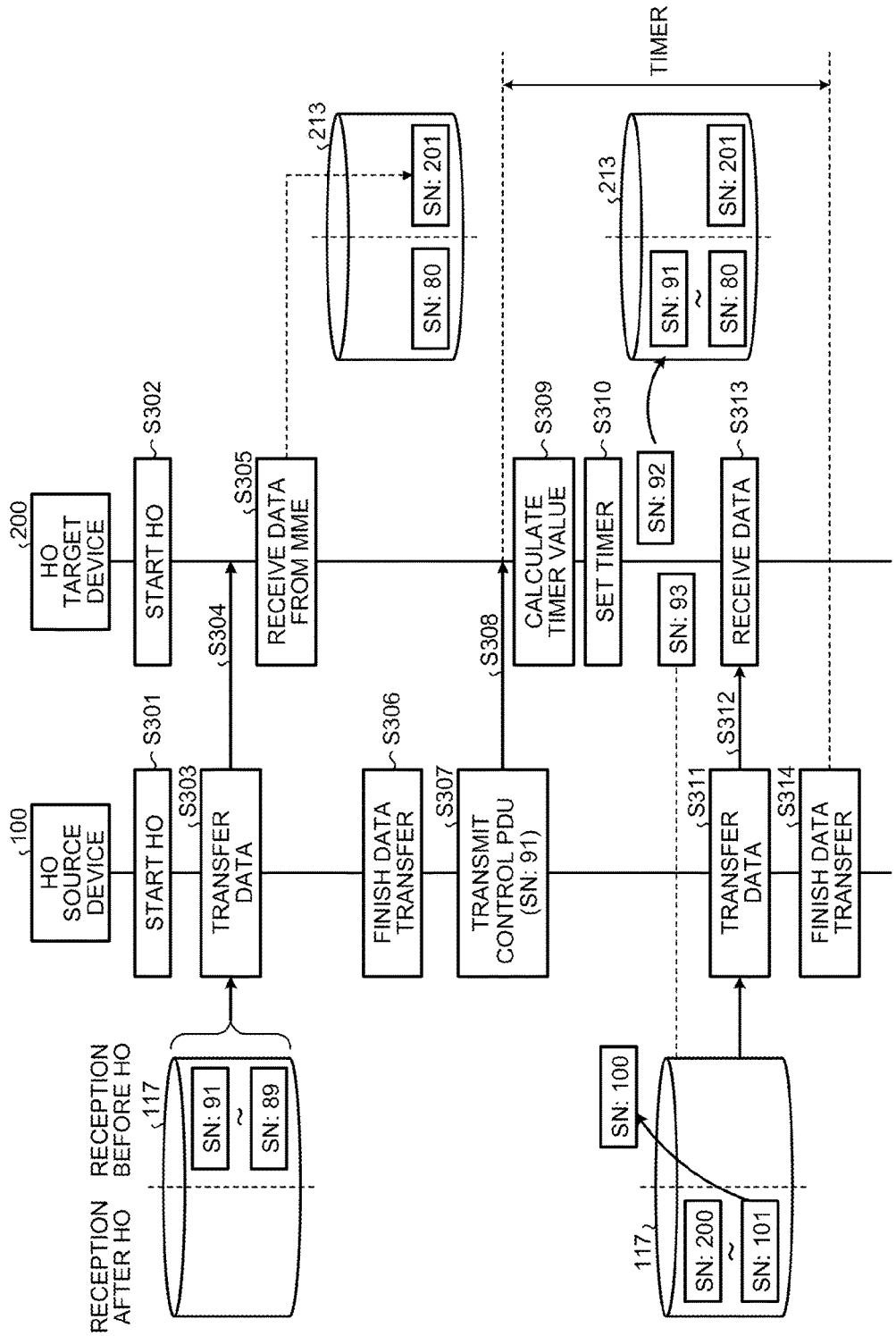
FIG. 11 is a diagram for explaining timer setting according to the second embodiment.

FIG. 11 is a diagram for explaining timer setting according to the second embodiment. As illustrated in FIG. 11, if the HO source device 100 receives a message indicating start of HO from the MME/S-GW 6, the HO source device 100 starts HO (S301). Similarly, if the HO target device 200 receives a message indicating start of HO from the MME/S-GW 6, the HO target device 200 starts HO (S302).

The HO source device 100 that starts the HO transfers S1 data received before the start of HO and stored in an SDU buffer 117 to the HO target device 200 in order of the sequential number (S303 and S304). In the example in FIG. 11, the HO source device 100 transfers the S1 data to the HO target device 200 in order from "PDCP SDU" of "SN: 89".

By contrast, the HO target device 200 stores S1 data received from the MME/S-GW 6 during the HO in an SDU buffer 213 (S305). In the example in FIG. 11, the HO target device 200 receives and stores therein "PDCP SDU" of "SN: 201".

If data transfer of "PDCP SDU" received before the start of HO is completed (S306), the HO source device 100 transmits control PDU to the HO target device 200 (S307 and S308). The transmitted control PDU serves as an end mark indicating completion of data transfer of "PDCP SDU" received before the start of HO. The transmitted control PDU includes the SN information "SN: 91" of the "PDCP SDU", which is the last transferred S1 data out of the S1 data received before the start of HO.

Subsequently, the HO target device 200 calculates a timer value based on the SN information received from the HO source device 100 and statistical information acquired by the HO target device 200 itself (S309) and starts the data transfer end monitoring timer (S310).

Subsequently, the HO source device 100 transfers "PDCP SDU" received after the start of HO and stored in the SDU buffer 117 to the HO target device 200 in order of the sequential number (S311 and S312). The HO target device 200 receives the S1 data transmitted from the HO source device 100 (S313). Thus, the HO source device 100 completes data transfer (S314).

In the example in FIG. 11, the HO source device 100 transfers the S1 data to the HO target device 200 in order from the S1 data of "SN: 92" and performs the transfer processing until transfer of the last S1 data of "SN: 200" is completed.

Functional Configuration of a Base Station Apparatus

Figure 12:
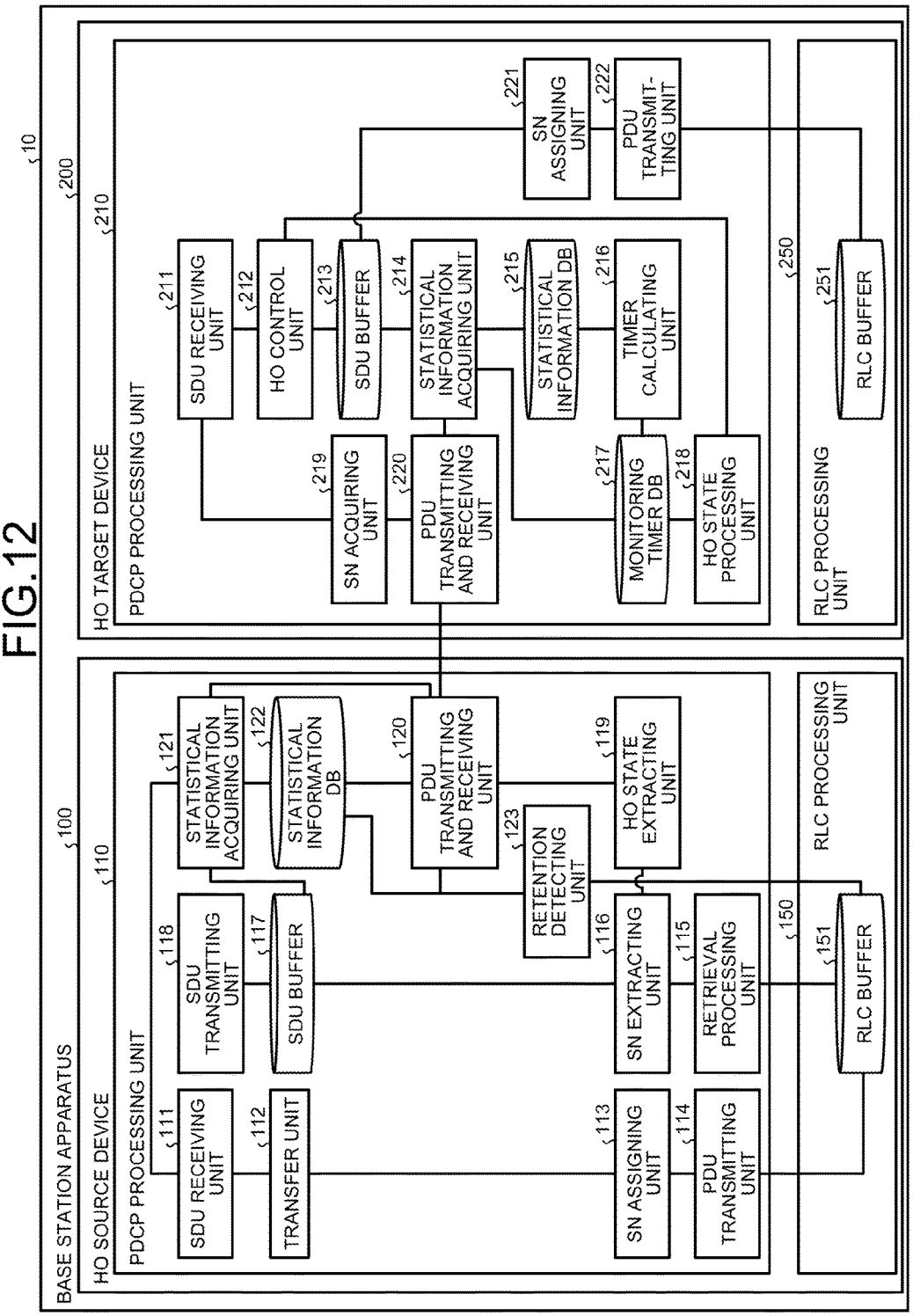
FIG. 12 is a functional block diagram of a functional configuration of a base station apparatus according to the second embodiment.

FIG. 12 is a functional block diagram of a functional configuration of a base station apparatus according to the second embodiment. Similarly to the first embodiment, a base station apparatus 10 includes the HO source device 100 and the HO target device 200 as illustrated in FIG. 12. The second embodiment describes different functions from those of the first embodiment.

HO Source Device

As illustrated in FIG. 12, the HO source device 100 includes a PDCP processing unit 110 and an RLC processing unit 150. Because the RLC processing unit 150 has the same function as that of the first embodiment, detailed explanation thereof will be omitted.

Besides the processing units described in the first embodiment, the PDCP processing unit 110 includes a statistical information acquiring unit 121, a statistical information DB 122, and a retention detecting unit 123. Because the other processing units have the same functions as those of the first embodiment, detailed explanation thereof will be omitted.

The statistical information acquiring unit 121 is a processing unit that acquires statistical information of the HO source device 100 and stores the statistical information in the statistical information DB 122 after the start of HO. Specifically, when data already received by the HO source device 100 at the start of HO is transmitted to the HO target device 200, the statistical information acquiring unit 121 acquires statistical information on the data.

FIG. 13 is an example diagram of statistical information on data received by the HO source from a host apparatus according to the second embodiment. As illustrated in FIG. 13, the statistical information acquiring unit 121 acquires "a PDCP SDU reception rate, the number of received PDCP SDU, and a retention amount of PDCP SDU to be a subject of HO".

The "PDCP SDU reception rate" is a reception rate at which "PDCP SDU" is received from the MME/S-GW 6 and is set in advance, for example. The "number of received PDCP SDU" is the number of "PDCP SDU" already received at the start of HO and is calculated by counting data. The "retention amount of PDCP SDU to be a subject of HO" is an amount of data transferred to the HO target device 200. In the example in FIG. 13, the "PDCP SDU reception rate" is "10×(10 to the power of 6) bps", the "number of received PDCP SDU" is "91 packets", and the "retention amount of PDCP SDU to be a subject of HO" is "46592 bytes".

The statistical information acquiring unit 121 can also acquire statistical information on data to be transmitted to the HO target device 200 based on the statistical information illustrated in FIG. 13 and network information of the HO target device 200 and the HO source device 100, for example.

FIG. 14 is an example diagram of statistical information on data transmitted from the HO source to the HO target according to the second embodiment. As illustrated in FIG. 14, the statistical information acquiring unit 121 acquires "an HO source transmission rate, an average transmission data length, and the oldest transmitted SN in the buffer before HO".

The "HO source transmission rate" is a rate of transmission from the HO source device 100 to the HO target device 200 and is set in advance, for example. The "average transmission data length" is an average data length of S1 data transmitted to the HO target and is derived by calculating "retention amount of PDCP SDU to be a subject of HO/number of received PDCP SDU". The "oldest transmitted SN in the buffer before HO" is a sequential number of the last received S1 data out of S1 data received before the start of HO at the start of HO.

In the case illustrated in FIG. 14, the "HO source transmission rate" is "5×(10 to the power of 6) bps", the "average transmission data length" is "512 bytes", and the "oldest transmitted SN in the buffer before HO" is "91".

The statistical information DB 122 is a storage device that stores therein various types of statistical information acquired by the statistical information acquiring unit 121. The statistical information DB 122, for example, stores therein the statistical information illustrated in FIG. 13 and FIG. 14.

The retention detecting unit 123 is a processing unit that detects the number of retained S1 data already received at the start of HO. Specifically, the retention detecting unit 123 refers to an RLC buffer 151 of the RLC processing unit 150 to detect the amount of data and the number of data of S1 data already received but yet to be transmitted to the terminal device 5. The retention detecting unit 123 stores the results in the statistical information DB 122 and notifies the statistical information acquiring unit 121 of the results.

The retention detecting unit 123 detects the last S1 data already received at the start of HO. Specifically, the retention detecting unit 123 refers to the RLC buffer 151 of the RLC processing unit 150 to identify the S1 data having the newest sequential number. The retention detecting unit 123 notifies the statistical information DB 122 and a PDU transmitting and receiving unit 120 of the sequential number of the identified S1 data. In the example above, the retention detecting unit 123 identifies the sequential number "SN: 91".

Similarly to the first embodiment, when transmission of S1 data already received at the start of HO is completed, the PDU transmitting and receiving unit 120 transmits control PDU. The second embodiment is different from the first embodiment in that the PDU transmitting and receiving unit 120 adds the statistical information of the HO source and the last sequential number of the already received S1 data to the control PDU. In the example above, the PDU transmitting and receiving unit 120 transmits, to the HO target device 200, control PDU to which "the HO source transmission rate=5×(10 to the power of 6) bps and the average transmission data length=512 bytes", and "SN: 91" are added.

HO Target Device

Similarly to the first embodiment, the HO target device 200 includes a PDCP processing unit 210 and an RLC processing unit 250 as illustrated in FIG. 12. Because the RLC processing unit 250 has the same function as that of the first embodiment, detailed explanation thereof will be omitted.

An explanation will be made of different points from those of the first embodiment. Specifically, a PDU transmitting and receiving unit 220 receives control PDU including the last sequential number of the S1 data already received by the HO source device 100, for example. The PDU transmitting and receiving unit 220 receives control PDU to which "the HO source transmission rate=5×(10 to the power of 6) bps and the average transmission data length=512 bytes" and "SN: 91" are added, for example.

A statistical information acquiring unit 214 stores various types of information added to the control PDU received by the PDU transmitting and receiving unit 220 in a statistical information DB 215. FIG. 15 is an example diagram of statistical information acquired by the HO target according to the second embodiment. As illustrated in FIG. 15, the statistical information acquiring unit 214 acquires "an HO target reception rate, an average reception data length, an S1 reception first SN, and an estimated number of transmitted S1 data".

The "HO target reception rate" corresponds to the "HO source transmission rate" received from the HO source. The "average reception data length" corresponds to the "average transmission data length" received from the HO source. The "S1 reception first SN" is a sequential number of the S1 data received from the MME/S-GW 6 during the HO. The "estimated number of transmitted S1 data" is the number of S1 data received from the HO source after control PDU is received from the HO source. The "estimated number of transmitted S1 data" is derived by calculating "(S1 reception first SN−1)−(the last sequential number of the S1 data already received by the HO source device 100+1)+1".

In the case illustrated in FIG. 15, the "HO target reception rate" is "5×(10 to the power of 6) bps", the "average reception data length" is "512 bytes", and the "S1 reception first SN" is "201". The statistical information acquiring unit 214 derives the "estimated number of transmitted S1 data" by calculating "(201−1)−(91+1)+1=109". The "estimated number of transmitted S1 data" is the number of S1 data received by the HO source after the HO. In the example above, the "estimated number of transmitted S1 data" is the number of S1 data from a sequential number 92 to a sequential number 200.

When HO is started and the statistical information of the HO source is received, a timer calculating unit 216 calculates a data transfer monitoring timer and stores the result in a monitoring timer DB 217 while the HO is being performed. Specifically, the timer calculating unit 216 calculates "data transfer monitoring timer=((average reception data length×estimated number of transmitted S1 data)×8)/transmission rate". In the example above, the timer calculating unit 216 calculates "data transfer monitoring timer=((512×109)×8)/5×(10 to the power of 6) 0.089".

An HO state processing unit 218 starts the data transfer monitoring timer. When the time calculated by the timer calculating unit 216 during the HO expires, the HO state processing unit 218 notifies an HO control unit 212 of the end of HO. Thus, the HO control unit 212 finishes the HO.

Flow of Processing

Figure 16:
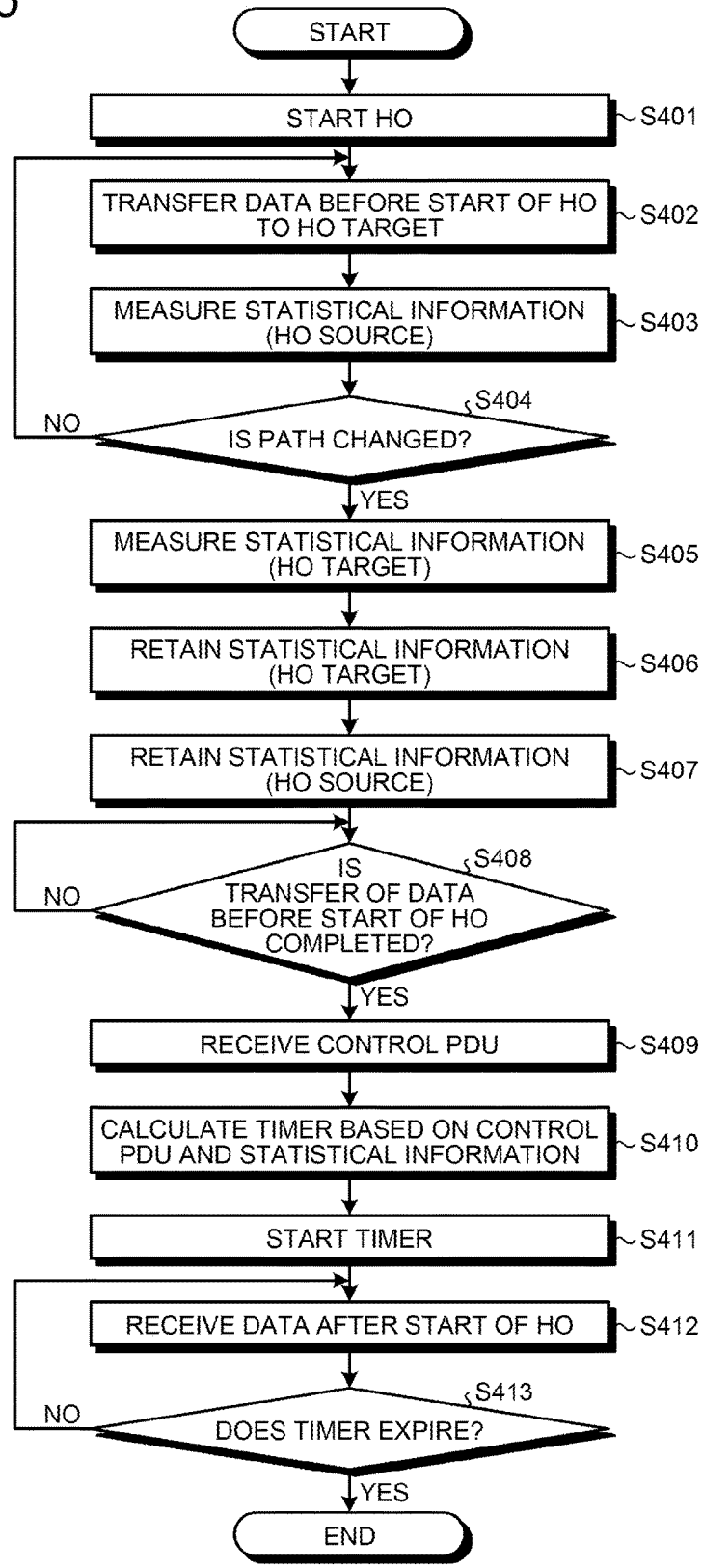
FIG. 16 is a flowchart of processing performed by the base station apparatus according to the second embodiment.

FIG. 16 is a flowchart of processing performed by the base station apparatus according to the second embodiment. As illustrated in FIG. 16, if a handover is started (S401), the HO source device 100 transfers S1 data received before the start of HO to the HO target device 200 (S402). At this time, the HO source device 100 measures statistical information based on the S1 data to be transmitted and a transmission state (S403).

Subsequently, if the destination of the path from the MME/S-GW 6 is changed from the HO source device 100 to the HO target device 200 (Yes at S404), the HO target device 200 measures and retains statistical information based on S1 data received from the MME/S-GW 6 (S405 and S406). The HO source device 100 acquires and retains the statistical information illustrated in FIG. 14, for example.

Similarly, the HO source device 100 measures and retains statistical information based on S1 data received from the MME/S-GW 6 despite the switching of the path (S407). The HO target device 200 acquires and retains the statistical information illustrated in FIGS. 13 and 14, for example.

If the HO source device 100 completes transfer of the S1 data received before the start of HO (Yes at S408), the HO target device 200 receives control PDU from the HO source device 100 (S409). The control PDU includes SN information and the statistical information acquired by the HO source device 100.

The HO target device 200 calculates a timer value of the data transfer monitoring timer based on the control PDU and the statistical information retained at S406 (S410). The HO target device 200 then starts the data transfer monitoring timer (S411).

Subsequently, the HO target device 200 receives S1 data received by the HO source device 100 after the start of HO from the HO source device 100 (S412). If the data transfer monitoring timer expires (Yes at S413), the HO target device 200 finishes the HO.

Advantageous Effects

As described above, the HO target device 200 can predict the data transfer monitoring timer in real time. When the data transfer monitoring timer expires, the HO target device 200 can complete HO. Therefore, the HO target device 200 can reduce an unnecessary data transfer time during the HO. Thus, the HO target device 200 can reduce an HO processing time, thereby quickly performing the HO.

[c] Third Embodiment

The second embodiment has described an example where the handover target calculates the timer value. The embodiment, however, is not limited thereto, and the handover source may calculate the timer value. A third embodiment describes an example where a handover source calculates a monitoring timer in real time during a handover.

Timer Setting

Figure 17:
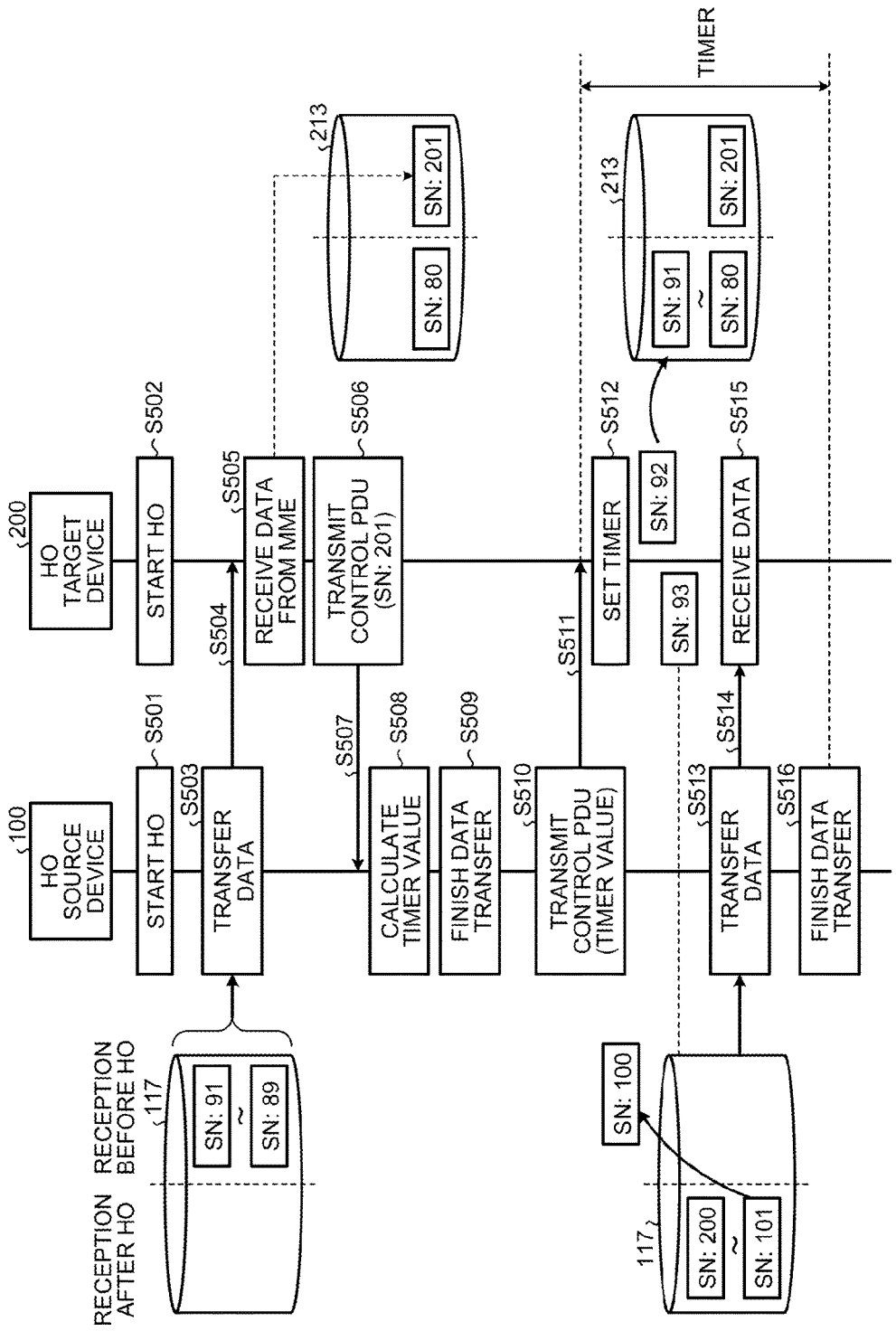
FIG. 17 is a diagram for explaining timer setting according to a third embodiment.

FIG. 17 is a diagram for explaining timer setting according to the third embodiment. As illustrated in FIG. 17, if an HO source device 100 receives a message indicating start of HO from an MME/S-GW 6, the HO source device 100 starts HO (S501). Similarly, if an HO target device 200 receives a message indicating start of HO from the MME/S-GW 6, the HO target device 200 starts HO (S502).

The HO source device 100 that starts the HO transfers S1 data received before the start of HO to the HO target device 200 in order of the sequential number (S503 and S504). In the example in FIG. 17, the HO source device 100 transfers the S1 data to the HO target device 200 in order from "PDCP SDU" of "SN: 89".

By contrast, if the HO target device 200 receives S1 data from the MME/S-GW 6, the HO target device 200 stores the S1 data in an SDU buffer 213 (S505). In the example in FIG. 17, the HO target device 200 receives and stores therein "PDCP SDU" of "SN: 201".

Subsequently, the HO target device 200 transmits, to the HO source device 100, control PDU to which the sequential number of the S1 data received from the MME/S-GW 6 is added (S506 and S507). FIG. 18 is an example diagram of a format of control PDU transmitted from the HO target to the HO source according to the third embodiment. As illustrated in FIG. 18, the control PDU includes "D/C, PDU Type, HO Control TYPE, SN, and an HO target reception rate".

"D/C, PDU Type, and HO Control TYPE" are the same as those described with reference to FIG. 6. "SN" is a sequential number of S1 data received from the MME/S-GW 6 and is "SN: 201" in the example above. The "HO target reception rate" is a reception rate at which the HO target device 200 receives data from the HO source device 100 and is "5×(10 to the power of 6) bps", for example.

Referring back to FIG. 17, if the HO source device 100 receives the control PDU from the HO target device 200, the HO source device 100 calculates a timer value based on the received information and statistical information acquired by the HO source device 100 itself (S508). The timer value is calculated by a PDCP processing unit 110 of the HO source device 100. The timer value may be calculated by a PDU transmitting and receiving unit 120 of the HO source device 100, for example. Alternatively, a timer calculating unit may be separately provided to the PDCP processing unit 110.

If data transfer of "PDCP SDU" received before the start of HO is completed (S509), the HO source device 100 transmits control PDU to the HO target device 200 (S510 and S511). The transmitted control PDU includes the timer value.

FIG. 19 is an example diagram of a format of control PDU transmitted from the HO source to the HO target according to the third embodiment. As illustrated in FIG. 19, the control PDU includes "D/C, PDU Type, HO Control TYPE, TIMER, an HO source transmission rate, an average transmission data length, and an estimated number of transmitted S1 data".

"D/C, PDU Type, and HO Control TYPE" are the same as those described with reference to FIG. 6. "TYMER" is a timer value of the data transfer end monitoring timer calculated by the HO source device 100. "An HO source transmission rate, an average transmission data length, and an estimated number of transmitted S1 data" are the same as those described in the second embodiment.

If the HO target device 200 receives the control PDU including the timer value, the HO target device 200 sets the timer value and starts the data transfer end monitoring timer (S512). Subsequently, the HO source device 100 transfers S1 data received after the start of HO and stored in an SDU buffer 117 to the HO target device 200 in order of the sequential number (S513 and S514). The HO target device 200 receives the S1 data transmitted from the HO source device 100 (S515). Thus, the HO source device 100 completes data transfer (S516).

In the example in FIG. 17, the HO source device 100 transfers the S1 data to the HO target device 200 in order from the S1 data of "SN: 92" and performs the transfer processing until transfer of the last S1 data of "SN: 200" is completed.

Flow of Processing

Figure 20:
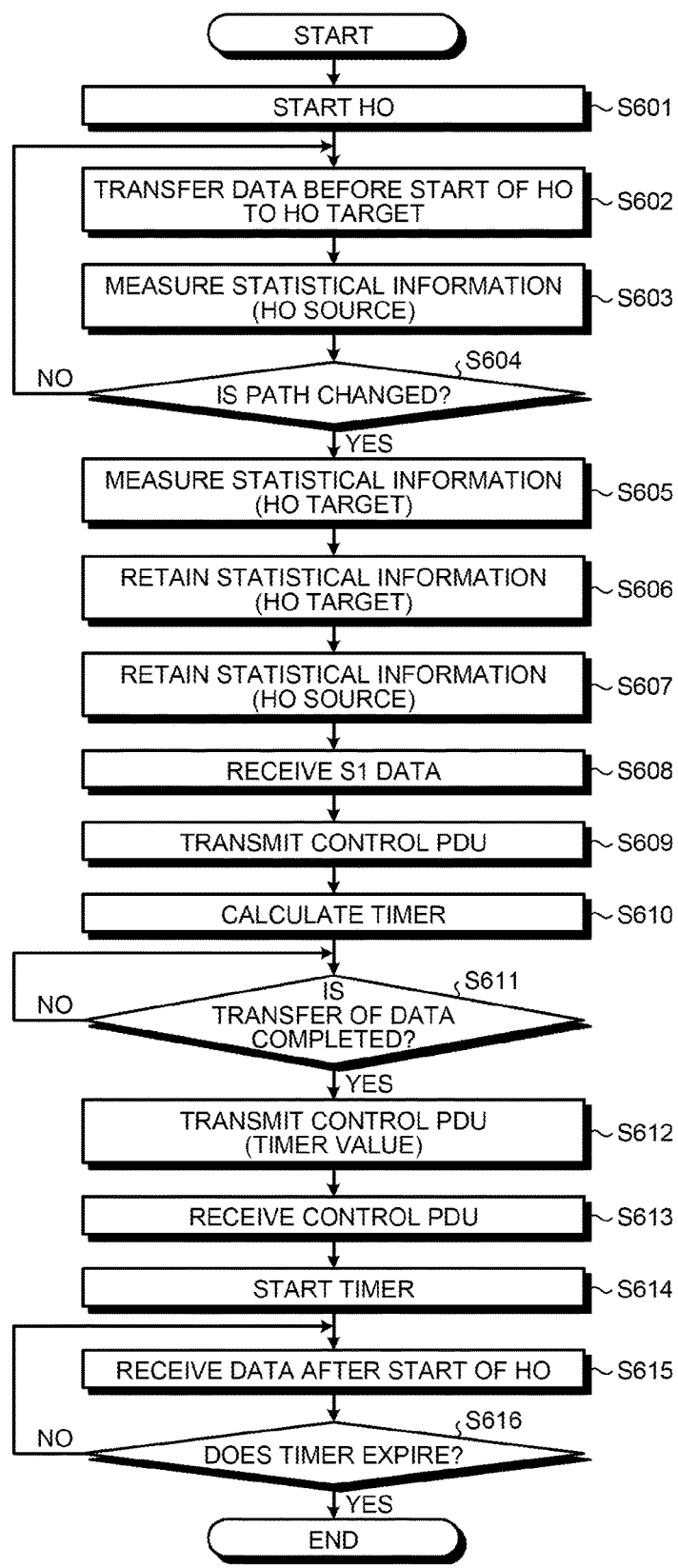
FIG. 20 is a flowchart of processing performed by a base station apparatus according to the third embodiment.

FIG. 20 is a flowchart of processing performed by a base station apparatus according to the third embodiment. As illustrated in FIG. 20, if a handover is started (S601), the HO source device 100 transfers S1 data received before the start of HO to the HO target device 200 (S602). At this time, the HO source device 100 measures statistical information based on the S1 data to be transmitted and a transmission state (S603).

Subsequently, if the destination of the path from the MME/S-GW 6 is changed from the HO source device 100 to the HO target device 200 (Yes at S604), the HO target device 200 measures and retains statistical information (S605 and S606). The HO target device 200 acquires and retains the "HO target reception rate", for example.

Similarly, the HO source device 100 measures and retains statistical information based on S1 data received from the MME/S-GW 6 despite the switching of the path (S607). The HO source device 100 acquires and retains the statistical information illustrated in FIGS. 13 and 14, for example.

Subsequently, the HO target device 200 receives S1 data from the MME/S-GW 6 (S608). The HO target device 200 then transmits control PDU including the sequential number of the S1 data to the HO source device 100 (S609).

The HO source device 100 that receives the control PDU uses each piece of statistical information to calculate a timer value (S610). If transfer of the S1 data received before the start of HO is completed (Yes at S611), the HO source device 100 transmits control PDU including the calculated timer value to the HO target device 200 (S612).

The HO target device 200 receives the control PDU (S613). The HO target device 200 then sets the timer value included in the received control PDU and starts the data transfer monitoring timer (S614). Subsequently, the HO target device 200 receives S1 data received by the HO source device 100 after the start of HO from the HO source device 100 (S615). If the data transfer monitoring timer expires (Yes at S616), the HO target device 200 finishes the HO.

Advantageous Effects

As described above, the HO source device 100 can predict the data transfer monitoring timer in real time and notify the HO target device 200 of the timer. Therefore, even in a case where the HO target device 200 has a high processing load, the HO source device 100 can calculate and set the data transfer monitoring timer in real time without delay.

[d] Fourth Embodiment

The embodiments above have described an example where the timer value of the data transfer monitoring timer is calculated using the statistical information of the HO source and the HO target. The embodiments, however, are not limited thereto, and the timer value may be calculated based on buffer capacity of the HO target, for example. A fourth embodiment describes an example where a timer value is calculated based on buffer capacity of an HO target.

Specifically, when an HO target device 200 transmits control PDU including a sequential number of S1 data received from an MME/S-GW 6, the HO target device 200 also transmits available buffer capacity. FIG. 21 is an example diagram of statistical information acquired by the HO target according to the fourth embodiment. As illustrated in FIG. 21, the HO target device 200 acquires "an HO target reception rate and HO target available buffer capacity".

The "HO target reception rate" is a reception rate at which the HO target device 200 receives data from an HO source device 100 and is "5×(10 to the power of 6) bps", for example. The "HO target available buffer capacity" is a free space in an SDU buffer 213 and is "1×(10 to the power of 6) bytes", for example.

FIG. 22 is an example diagram of a format of control PDU transmitted from the HO target to the HO source according to the fourth embodiment. As illustrated in FIG. 22, the control PDU includes "D/C, PDU Type, HO Control TYPE, SN, an HO target reception rate, and HO target available buffer capacity".

"D/C, PDU Type, and HO Control TYPE" are the same as those described with reference to FIG. 6. "SN" is a sequential number of S1 data received from the MME/S-GW 6. The "HO target reception rate and HO target available buffer capacity" are the statistical information acquired by the HO target device 200.

The HO source device 100 changes a transmission rate based on the "HO target available buffer capacity" received from the HO target device 200. In other words, in a case where the buffer capacity of the HO target is equal to or larger than a threshold and has some room, the HO source device 100 increases the transmission rate. By contrast, in a case where the buffer capacity of the HO target is smaller than the threshold and has no room, the HO source device 100 decreases the transmission rate.

As a result, the HO source device 100 dynamically changes the "transmission rate" in data transfer monitoring timer=((average reception data length×estimated number of transmitted S1 data)×8)/transmission rate". Thus, the HO source device 100 can dynamically change the timer value of the data transfer monitoring timer" based on the free space in the buffer of the HO target.

Flow of Processing

Figure 23:
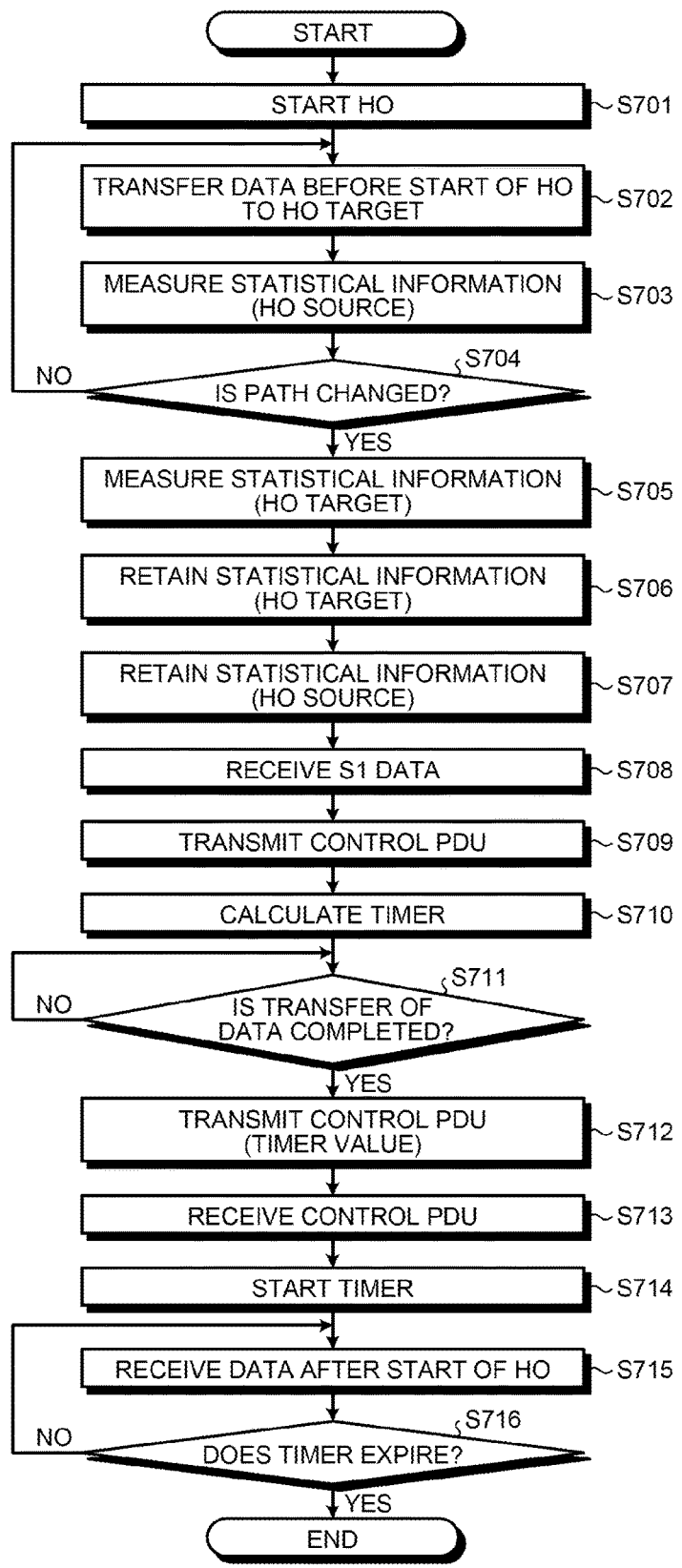
FIG. 23 is a flowchart of processing performed by a base station apparatus according to the fourth embodiment.

FIG. 23 is a flowchart of processing performed by a base station apparatus according to the fourth embodiment. As illustrated in FIG. 23, if a handover is started (S701), the HO source device 100 transfers S1 data received before the start of HO to the HO target device 200 (S702). At this time, the HO source device 100 measures statistical information based on the S1 data to be transmitted and a transmission state (S703).

Subsequently, if the destination of the path from the MME/S-GW 6 is changed from the HO source device 100 to the HO target device 200 (Yes at S704), the HO target device 200 measures and retains statistical information (S705 and S706). The HO target device 200 acquires and retains the statistical information illustrated in FIG. 21, for example.

Similarly, the HO source device 100 measures and retains statistical information based on S1 data received from the MME/S-GW 6 despite the switching of the path (S707). The HO source device 100 acquires and retains the statistical information illustrated in FIGS. 13 and 14, for example.

Subsequently, the HO target device 200 receives S1 data from the MME/S-GW 6 (S708). The HO target device 200 then transmits control PDU including the sequential number of the S1 data and available capacity of the SDU buffer 213 to the HO source device 100 (S709).

The HO source device 100 that receives the control PDU uses the transmitted buffer capacity and each piece of statistical information to calculate a timer value (S710). The timer value is calculated by a PDCP processing unit 110 of the HO source device 100. The timer value may be calculated by a PDU transmitting and receiving unit 120 of the HO source device 100, for example. Alternatively, a timer calculating unit may be separately provided to the PDCP processing unit 110.

If transfer of the S1 data received before the start of HO is completed (Yes at S711), the HO source device 100 transmits control PDU including the timer value to the HO target device 200 (S712).

The HO target device 200 receives the control PDU (S713). The HO target device 200 then sets the timer value included in the received control PDU and starts the data transfer monitoring timer (S714). Subsequently, the HO target device 200 receives S1 data received by the HO source device 100 after the start of HO from the HO source device 100 (S715). If the data transfer monitoring timer expires (Yes at S716), the HO target device 200 finishes the HO.

Explanation of Timer Setting

FIG. 24 is a diagram for explaining timer setting according to the fourth embodiment. In a case where the available buffer capacity of the HO target device 200 is small as illustrated in the upper figure in FIG. 24, the HO source device 100 transfers S1 data at a decreased transmission rate to suppress a situation where the HO target device 200 discards the received S1 data because of buffer capacity shortage. In other words, a traffic amount of an X2 line between the HO source device 100 and the HO target device 200 decreases. This increases a time taken to transfer the S1 data. Therefore, the HO source device 100 calculates a timer value longer than usual.

By contrast, in a case where the available buffer capacity of the HO target device 200 is large as illustrated in the lower figure in FIG. 24, the HO source device 100 transfers S1 data at an increased transmission rate because the HO target device 200 is less likely to discard the data because of buffer capacity shortage. In other words, the traffic amount of the X2 line between the HO source device 100 and the HO target device 200 increases. This decreases a time taken to transfer the S1 data. Therefore, the HO source device 100 calculates a timer value shorter than usual.

Advantageous Effects

As described above, it is possible to calculate an appropriate timer value depending on a free space in the buffer of the HO target device 200. This can suppress a situation where the HO target fails to receive S1 data and discards the S1 data because of high-speed transfer of the S1 data despite the absence of a free space in the buffer of the HO target, for example. Furthermore, this can also suppress a situation where a time taken to transfer the S1 data unnecessarily increases because of low-speed transfer of the S1 data despite the presence of a free space in the buffer of the HO target.

While the embodiments of the present invention have been described, the present invention may be embodied in various different aspects besides the embodiments above. The following describes other embodiments.

Control Device

While the processing units in the base station apparatus perform the handover control in the embodiments above, the embodiments are not limited thereto. A control device that performs the handover control may be provided to a housing separated from the base station apparatus, for example. Alternatively, the control device that performs the handover control may be provided as another BB card or another unit in the base station apparatus.

SN Information

While the sequential number is assigned to data when the data is transmitted from the PDCP processing unit to the RLC processing unit in the embodiments above, the embodiments are not limited thereto. A sequential number already assigned to "PDCP SDU" when the base station apparatus 10 receives it may be used, for example.

Transmission Rate

While the transmission rate and the reception rate are set in advance in the embodiments above, the embodiments are not limited thereto. The HO source device 100 and the HO target device 200 may actually measure the rates each time or calculate them from previous data transfer, for example.

System

All or a part of the processing described to be automatically performed out of the processing described in the embodiments may be manually performed. Alternatively, all or a part of the processing described to be manually performed may be automatically performed by a known method. Furthermore, the processing procedures, the control procedures, the specific names, and the information including various types of data and parameters described in the specification and the drawings may be optionally changed unless otherwise provided.

The components of each device illustrated in the drawings are functionally conceptual and are not necessarily physically configured as illustrated. In other words, the specific aspects of distribution and integration of each device are not limited to those illustrated in the drawings. All or a part of the components may be distributed or integrated functionally or physically in desired units depending on various types of loads and usage, for example. Furthermore, all or a desired part of the processing functions carried out by each device can be provided by a CPU and a computer program analyzed and executed by the CPU or as wired logic hardware.

An aspect of the wireless communication apparatus and the method for controlling a handover in a base station apparatus according to the present application can improve the communication efficiency.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus including a first device and a second device, the second device comprising:
   a memory; and
   a processor that is connected to the memory, wherein the processor executes a process including:
      acquiring handover source information including handover (HO) target average received data and HO target average reception rate received in previous handovers which switch a connection destination of a terminal device from the first device to the second device, the HO target average received data indicating an average value of data amounts received in the previous handovers, the HO target average reception rate indicating an average value of communication rates in the previous handovers, the data amounts indicating total of data which is transmitted to the first device from a mobility management entity while the connection destination of the terminal device is switched from the first device to the second device in the previous handovers;
      calculating a timer value by dividing the HO target average received data by the HO target average reception rate,
      when a new handover occurs, receiving a first data group including data which is transmitted to the first device from the mobility management entity before the new handover and is not yet transmitted to the terminal device from the first device;
      starting a timer in which the time timer value calculated based on the handover source information of the previous handovers is set when notification which is transmitted by the first device and which indicates that transmission of the first data group is completed is received; and
      receiving a second data group from the first device when the timer is started and stopping reception of the second data group when the timer has expired, the second data group including data which is transmitted to the first device from the mobility management entity while the connection destination of the terminal device is switched from the first device to the second device in the new handover.

2. The wireless communication apparatus according to claim 1, wherein the process further comprises;
   acquiring handover target information on data which is transmitted to terminal device by the mobility management entity and is received by the second device after the connection destination of terminal device is switched from the first device to the second device by the handover; and estimating an amount of the second data group to be transferred from the first device to the second device from the handover source information and the handover target information and calculating a time taken to transfer the estimated amount of the second data group from the first device to the second device.

3. The wireless communication apparatus according to claim 2, wherein the process further comprises;
acquiring a free space in a buffer included in the second device; and
changing a transfer amount to be transferred from the first device to the second device depending on the acquired free space and calculating the time taken to transfer the estimated amount of the second data group from the first device to the second device with the changed transfer amount.

4. A wireless communication method comprising:
acquiring handover source information including handover (HO) target average received data and HO target average reception rate received in previous handovers which switch a connection destination of a terminal device from the first device to the second device, the HO target average received data indicating an average value of data amounts received in the previous handovers, the HO target average reception rate indicating an average value of communication rates in the previous handovers, the data amounts indicating total of data which is transmitted to the first device from a mobility management entity while the connection destination of the terminal device is switched from the first device to the second device in the previous handovers;
calculating a timer value by dividing the HO target average received data by the HO target average reception rate,
when a new handover occurs, receiving a first data group including data which is transmitted to the first device from the mobility management entity before the new handover and is not yet transmitted to the terminal device from the first device;
starting a timer in which the timer value calculated based on the handover source information of the previous handovers is set when notification which is transmitted by the first device and which indicates that transmission of the first data group is completed is received, using the second device; and
receiving a second data group from the first device when the timer is started and stopping reception of the second data group when the timer has expired, using the second device, the second data group including data which is transmitted to the first device from the mobility management entity while the connection destination of the terminal device is switched from the first device to the second device in the new handover.

* * * * *